(12) United States Patent
Suwabe et al.

(10) Patent No.: US 7,591,918 B2
(45) Date of Patent: Sep. 22, 2009

(54) CERAMIC HONEYCOMB STRUCTURE AND ITS PRODUCTION METHOD AND COATING MATERIAL USED THEREFOR

(75) Inventors: Hirohisa Suwabe, Fukuoka-ken (JP); Yasuhiko Otsubo, Fukuoka-ken (JP); Toshiaki Kimura, Fukuoka-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/689,880

(22) Filed: Mar. 22, 2007

(65) Prior Publication Data
US 2007/0158879 A1    Jul. 12, 2007

Related U.S. Application Data

(63) Continuation of application No. 10/517,866, filed as application No. PCT/JP03/76876 on Jun. 17, 2003.

(30) Foreign Application Priority Data

| Jun. 17, 2002 | (JP) | ............... 2002-175372 |
| Jun. 17, 2002 | (JP) | ............... 2002-175374 |
| Sep. 6, 2002 | (JP) | ............... 2002-262088 |
| Nov. 11, 2002 | (JP) | ............... 2002-326852 |
| Dec. 6, 2002 | (JP) | ............... 2002-355022 |

(51) Int. Cl.
*C04B 33/34* (2006.01)
*B28B 1/30* (2006.01)
*C04B 35/14* (2006.01)
*B32B 3/12* (2006.01)
*B32B 3/20* (2006.01)

(52) U.S. Cl. ............... 156/89.22; 264/630; 428/116; 428/117; 428/188; 502/439

(58) Field of Classification Search ............. 156/89.22; 264/630; 428/116, 117, 188; 502/439
See application file for complete search history.

(56) References Cited

U.S. PATENT DOCUMENTS

| 5,188,779 | A | 2/1993 | Horikawa et al. |
| 5,629,067 | A | 5/1997 | Kotani et al. |
| 6,696,131 | B1 | 2/2004 | Nishimura et al. |
| 6,939,522 | B1 | 9/2005 | Harada et al. |
| 2001/0033910 | A1 | 10/2001 | Ikeshima |
| 2006/0168908 | A1* | 8/2006 | Ichikawa et al. ........... 52/793.1 |
| 2006/0217256 | A1* | 9/2006 | Katoh ........................ 501/1 |

FOREIGN PATENT DOCUMENTS

EP    0 554 104 A2    8/1993

(Continued)

*Primary Examiner*—Philip C Tucker
*Assistant Examiner*—Sing P Chan
(74) *Attorney, Agent, or Firm*—Sughrue Mion, PLLC

(57) ABSTRACT

A ceramic honeycomb structure comprising a ceramic honeycomb body comprising axial grooves on its periphery and cell walls constituting a larger number of flow paths inside the grooves, and a peripheral wall layer covering the grooves, wherein there are stress release portions at least partially in the peripheral wall layer and/or between the peripheral wall layer and the grooves. The thermal expansion coefficient of the peripheral wall layer is preferably smaller than those of the cell walls in a radial direction. The peripheral wall layer is preferably formed on the ceramic honeycomb body formed by removing a peripheral wall from a ceramic green body, before or after firing the ceramic honeycomb body.

14 Claims, 6 Drawing Sheets

FOREIGN PATENT DOCUMENTS

| | | |
|---|---|---|
| EP | 0554104 A2 | 8/1993 |
| EP | 1 138 389 A1 | 10/2001 |
| EP | 1 153 643 | 11/2001 |
| EP | 1 586 547 * | 10/2005 |
| EP | 1 704 920 * | 9/2006 |
| JP | 56-129044 A | 10/1981 |
| JP | 3-159933 * | 7/1991 |
| JP | 03-275309 | 12/1991 |
| JP | 05-269388 | 10/1993 |
| JP | 2001-046886 | 2/2001 |
| JP | 2001-46886 A | 2/2001 |
| JP | 2001-347364 A | 12/2001 |
| JP | 2004-75524 * | 3/2004 |

\* cited by examiner

CERAMIC HONEYCOMB STRUCTURE AND ITS PRODUCTION METHOD AND COATING MATERIAL USED THEREFOR

This application is a continuation of the U.S. application Ser. No. 10/517,866 filed Sep. 19, 2005, which is a National Stage application filed under §371 of PCT Application No. PCT/JP03/076876 filed Jun. 17, 2003. The entire disclosure of the prior application is hereby incorporated by reference.

FIELD OF THE INVENTION

The present invention relates to a ceramic honeycomb structure with a peripheral wall layer, which neither suffers from cracking nor peels off from a honeycomb body, and its production method. It particularly relates to a ceramic honeycomb structure having sufficient mechanical strength to avoid cracking, chipping, etc. by vibration, etc., when used in exhaust gas-cleaning catalytic converters or in particulates-capturing filters, which are likely to be subjected to thermal shock at high temperatures, and a production method thereof.

BACKGROUND OF THE INVENTION

From the aspect of protecting the environment not only in local areas but also in the entire globe, exhaust gas-cleaning catalytic converters and particulates-capturing filters with ceramic honeycombs are used to remove harmful substances such as carbon particulates, etc. from exhaust gases emitted from diesel engines. As shown in FIG. 1, a honeycomb structure 1 integrally comprises a peripheral wall 3 and cell walls 4 defining a large number of cells 6. The honeycomb structure 1 is strongly gripped by a grip member disposed between an inner surface of a metal container (not shown) and the peripheral wall 3 of the honeycomb structure 1.

The honeycomb structure 1 is conventionally produced according to the following steps. Cordierite-producing ingredient powder, a shaping aid, a pore-forming agent and water are kneaded to produce a soft ceramic material, which is shaped by extrusion to provide a green body having a honeycomb structure, in which the peripheral wall 3 and the cell walls 4 are integral with each other. After drying and removing the shaping aid such as a binder, etc. by heating, this green body is fired to provide a honeycomb structure 1 integrally composed of a finely porous peripheral wall 3 and finely porous cell walls 4, which have the predetermined shape and strength.

However, in the case of producing large ceramic honeycomb structures of 150 mm or more in outer diameter and 150 mm or more in height for diesel engines, and thin honeycomb structures with cell walls 4 as thin as 0.2 mm or less, for instance, the green bodies are too heavy or insufficient in strength to support themselves, causing the problem that the cell walls 4 near the peripheral wall 3 are collapsed or deformed.

As a method for solving this problem, Japanese Patent 2,604,876 discloses a method of kneading cordierite ingredients with a shaping aid and/or a pore-forming agent, shaping the resultant soft ceramic material by extrusion, drying and firing the resultant green body to provide a fired body having a honeycomb structure, removing a peripheral wall 3 and nearby cell walls from this fired body having a honeycomb structure by grinding, coating the exposed cell walls with a coating material, drying and curing it to form a peripheral wall layer. In this method, because the peripheral wall 3 and the nearby cell walls 4 are removed from the fired body having a honeycomb structure by grinding, the peripheral wall 3 and nearby deformed cells can be removed. When a fired body having a honeycomb structure has low roundness, the peripheral wall layer is formed after increasing the roundness by grinding. Accordingly, it is possible to improve the dimensional accuracy of the honeycomb structure. If coating materials containing ceramic fibers and inorganic binders were used, it would be possible to provide the peripheral wall layer with high strength.

As a ceramic honeycomb structure having a peripheral wall layer with improved peeling resistance, Japanese Patent 2,613,729 discloses a ceramic honeycomb structure having a peripheral wall layer composed of cordierite particles and/or ceramic fibers, and an amorphous oxide matrix comprising colloidal silica or colloidal alumina.

One example of the structure of a ceramic honeycomb 1 is shown in FIGS. 2 and 3. A ceramic honeycomb body 10 comprises a large number of cells 6 partitioned by cell walls 4, and axial grooves 14 formed on the outermost circumference of the ceramic honeycomb body 10, the grooves 14 being coated with a peripheral wall layer 12, which does not peel off from the honeycomb body 10 during use, while suppressing decrease in the thermal shock strength of the honeycomb structure 1.

It has been found, however, that when the ceramic honeycomb structures described in Japanese Patents 2,604,876 and 2,613,729 are used for catalytic converters for cleaning an exhaust gas and filters for capturing particulates, there arise the following problems.

When the ceramic honeycomb structure is used as a catalyst carrier and a particulate-capturing filter, the ceramic honeycomb structure is firmly gripped by a grip member in a metal container. Because a high-temperature exhaust gas flows through a larger number of flow paths in the ceramic honeycomb structure, rapid temperature elevation locally occurs particularly at the time of starting operation, causing temperature difference between the center portion and the peripheral wall layer of the ceramic honeycomb body, and thus generating thermal stress in the ceramic honeycomb structure, which sometimes leads to cracking in the peripheral wall layer. Also, when used as a particulate-capturing filter, local temperature elevation occurs particularly near the center portion of the honeycomb structure in which a large amount of particulates are accumulated, by heat generated by a regeneration treatment for burning particulates accumulated in the filter, resulting in cracking in the peripheral wall layer by thermal stress.

If cracking occurs in the peripheral wall layer and propagates to the cell walls, the cell walls are detached, resulting in decrease in the performance of cleaning an exhaust gas, and also decrease in a particulates-capturing rate because of the communication of flow paths between the inlet and outlet.

When a large honeycomb structure having an outer diameter of 150 mm or more and a length of 150 mm or more or a thin honeycomb structure with cell walls having a thickness of 0.15 mm or less is produced, an extrusion-shaped green body is likely to have defects such as breakage or deformation in cells near the peripheral wall. As a result, it has a remaining stress provided by shaping and drying. If firing is carried out with such defects, cracking is likely to propagate to free the remaining stress from defective portions, and spread in the entire fired body. Some cracks are not completely eliminated by removing the peripheral wall and the nearby cell walls from the fired body, resulting in decrease in a production yield.

Because the fired ceramic honeycomb is hard and brittle, as shown in FIG. 4, chipping 4a easily occurs in the outermost cell walls 4 constituting the grooves 14, and part of the cell walls 4 are easily cracked, resulting in defective grooves 14a. Because the grooves 14 on the circumference have a small contact area with the cell walls 4, the honeycomb structure 1 is likely to suffer from decrease in isostatic strength and the peeling of the peripheral wall layer 12. When such a honeycomb structure is used for catalytic converters and particulate-capturing filters, the peripheral wall layer peels off from the honeycomb structure by the vibration of an engine and vibration by contact with the road, so that a proper holding force cannot be maintained in the container, failing to keep the honeycomb structure from moving in the container, and thus resulting in the breakage of the honeycomb structure.

Japanese Patent 2,604,876 uses a grinder rotating at a high peripheral speed of 750 to 2100 m/minute to remove the peripheral wall from the fired ceramic honeycomb, to conduct grinding at a speed of 0.7 to 0.9 mm/minute. However, because the grinding of the cell walls of the honeycomb structure is an intermittent working, in which a tool impinges the cell walls intermittently, the extent of working such as feed and depth of cutting, etc. must be kept small, resulting in the long working time. In addition, because the fired body is hard and brittle, an expensive grinder such as a diamond grinder should be used.

In the above prior art, because a coating material comprising cordierite particles and an inorganic binder is applied to the outer surface of the honeycomb body made of cordierite to form the peripheral wall layer, the peripheral wall layer has a larger thermal expansion coefficient than that of the honeycomb body, resulting in a tensile stress remaining in the peripheral wall layer and a compression stress remaining in the cell walls after drying and firing. The reason why the peripheral wall layer has a larger thermal expansion coefficient than that of the honeycomb body is that because kaolin particles (hexagonal planar crystal) in the material passing through the narrow slits of an extrusion die slit are oriented in plane (in the walls), and because a hexagonal columnar cordierite crystal is orientated perpendicularly to the orientation direction of kaolin by firing, the cell walls have a small thermal expansion coefficient, while the peripheral wall layer is composed of the randomly orientated cordierite particles and the inorganic binder having a large thermal expansion coefficient.

When the honeycomb structure is gripped for the purpose of being introduced into the container, too, tensile stress may occur in the peripheral wall layer. When rapid temperature elevation occurs in the center portion of the honeycomb structure while the tensile stress exerting onto the peripheral wall layer, tensile stress in the peripheral wall layer increases due to the temperature difference between the cell walls and the peripheral wall layer, making it likely that cracking occurs in the peripheral wall layer.

OBJECT OF THE INVENTION

Accordingly, an object of the present invention is to provide a ceramic honeycomb structure having such excellent thermal shock resistance and reliability that cracking is not likely to occur in cell walls by thermal shock.

Another object of the present invention is to provide a ceramic honeycomb structure, in which cracking is not likely to occur by thermal shock when used in a catalytic converter for cleaning an exhaust gas or in a particulate-capturing filter.

A further object of the present invention is to provide a ceramic honeycomb structure with a peripheral wall layer not easily peeling off from a honeycomb body and thus having excellent isostatic strength, which can be produced efficiently.

A still further object of the present invention is to provide a method for producing such a ceramic honeycomb structure.

DISCLOSURE OF THE INVENTION

The first ceramic honeycomb structure of the present invention comprises a ceramic honeycomb body having grooves axially extending on its outer surface and cell walls constituting a large number of flow paths inside the grooves, and a peripheral wall layer covering the grooves, wherein the ceramic honeycomb body comprises stress release portions at least in a portion of the peripheral wall layer and/or in a portion between the peripheral wall layer and the grooves.

The above stress release portions are preferably voids open on the outer surface of the peripheral wall layer, or voids defined between the peripheral wall layer and the grooves. When the voids are formed in the peripheral wall layer, the total length of the voids is preferably one time or more the full length of the ceramic honeycomb structure. The voids are preferably slits, more preferably cracks in the peripheral wall layer. When the voids are present between the peripheral wall layer and the grooves, the number of the grooves having voids is preferably 5% or more of the number of the total grooves.

The second ceramic honeycomb structure of the present invention comprises a ceramic honeycomb body having grooves axially extending on its outer surface and cell walls constituting a large number of flow paths inside the grooves, and a peripheral wall layer covering the grooves, wherein the thermal expansion coefficient of the peripheral wall layer is smaller than those of the cell walls in a radial direction. The second ceramic honeycomb structure may comprise the features of the first ceramic honeycomb structure at the same time.

In the first and second ceramic honeycomb structures, the ceramic honeycomb bodies are preferably formed by the extrusion, drying and firing of a soft ceramic material, and their peripheral walls are preferably removed before or after firing.

The third ceramic honeycomb structure of the present invention comprises a ceramic honeycomb body having grooves axially extending on its outer surface and cell walls constituting a large number of flow paths inside the grooves, and a peripheral wall layer covering the grooves, the ceramic honeycomb body being obtained by removing a peripheral wall before firing.

The fourth ceramic honeycomb structure of the present invention comprises a ceramic honeycomb body having grooves axially extending on its outer surface and cell walls constituting a large number of flow paths inside the grooves, and a peripheral wall layer covering the grooves, wherein the peripheral wall layer is made of a mixture containing amorphous silica particles and an amorphous oxide matrix.

The amorphous oxide matrix is preferably formed from colloidal silica and/or colloidal alumina. The peripheral wall layer is more preferably made of a composition comprising 100 parts by mass of amorphous silica particles and 2 to 35 parts by mass of the amorphous oxide matrix.

The peripheral wall layer is preferably formed before or after firing the ceramic honeycomb body. When the peripheral wall layer is formed before firing, the peripheral wall layer preferably has a composition identical with or extremely close to that of the ceramic honeycomb body.

In the preferred embodiment of the present invention, the ceramic honeycomb structure has an isostatic strength of 1.5 MPa or more. The cell walls of the ceramic honeycomb structure have a porosity of 50 to 80% and an average pore size of 10 to 50 μm.

The method for producing a ceramic honeycomb structure comprising a ceramic honeycomb body having grooves axially extending on its outer surface and cell walls constituting a large number of flow paths inside the grooves, and a peripheral wall layer covering the grooves according to the present invention comprises the steps of shaping by extrusion and drying a soft ceramic material to form a ceramic honeycomb green body, removing a peripheral wall from the ceramic honeycomb green body to form a ceramic honeycomb body, and forming a peripheral wall layer on the ceramic honeycomb body before or after firing the ceramic honeycomb body.

It is preferable to fire the ceramic honeycomb green body on a table with its one opening end abutting the table, and then cut off a portion of the resultant fired body close to the table. The peripheral wall in a portion of the green body close to the table may be removed depending on the predicted dimensional change by firing.

The coating material of the present invention for forming the peripheral wall layer of the ceramic honeycomb structure comprises 100 parts by mass of amorphous silica particles and 2 to 35 parts by mass of colloidal silica and/or colloidal alumina on a solid basis. The fired ceramic honeycomb is preferably coated with this coating material and fired again to form the peripheral wall layer.

THE BEST MODE FOR CARRYING OUT THE INVENTION

[1] First Embodiment

The ceramic honeycomb structure according to the first embodiment comprises a ceramic honeycomb body having grooves axially extending on its outer surface and cell walls constituting a large number of flow paths inside the grooves, and a peripheral wall layer covering the grooves, the ceramic honeycomb body comprising stress release portions at least in a portion of the peripheral wall layer and/or in a portion between the peripheral wall layer and the grooves. The stress release portions drastically improve the thermal shock resistance of the honeycomb structure. When the ceramic honeycomb structure is rapidly heated by an exhaust gas, the stress release portions function to prevent thermal shock from accumulating in the peripheral wall layer, thereby making it unlikely that cracking occurs in the peripheral wall layer, and that even if cracking occurred, it would not propagate into cell walls. The cell walls are thus kept from falling, causing no decrease in an exhaust gas-cleaning capability and a particulates-capturing rate. Effective for releasing thermal shock stress is the formation of the stress release portions not only in the peripheral wall layer but also between the peripheral wall layer and the grooves.

Figure 5:
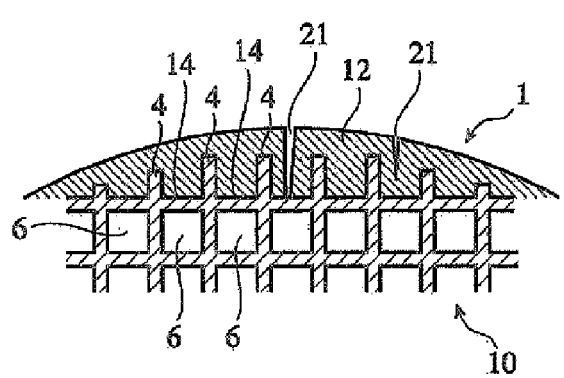
FIG. 5 is a partial cross-sectional view showing a peripheral wall layer with voids, which covers the ceramic honeycomb body shown in FIG. 2.
Figure 6:
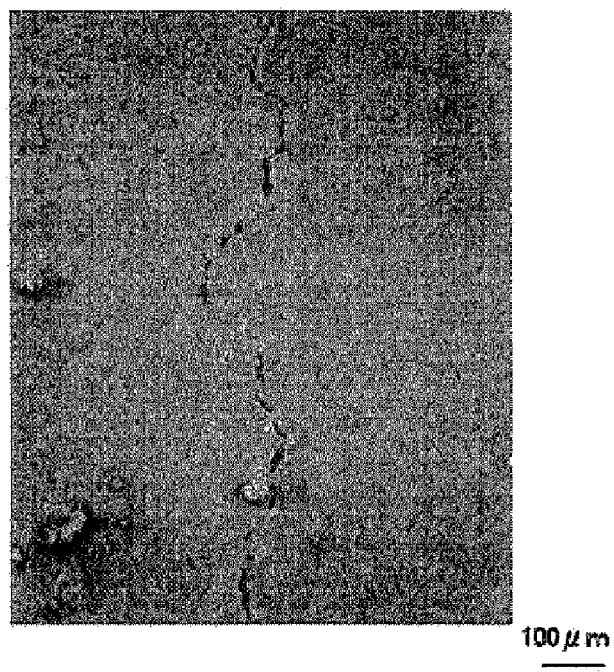
FIG. 6 is a scanning photomicrograph showing crack-shaped voids on the peripheral wall layer surface of the ceramic honeycomb structure of the present invention.

The stress release portions formed in the peripheral wall layer are, for instance, voids 21 formed such that they open on the outer surface of the peripheral wall layer 12 as shown in FIG. 5. The voids 21 are preferably, for instance, in a slit shape similar to cracks as shown in FIG. 7. For instance, long, narrow, slit-shaped voids 21 preferably have an opening width of 2 μm or more and a length of 100 μm or more. The bottom of the voids 21 may be located in the peripheral wall layer 12 or reach the bottom of the grooves 14. When the honeycomb structure is rapidly heated by an exhaust gas, the opening of the voids 21 expands, releasing thermal shock stress from the peripheral wall layer 12. The voids 21 are distinguishable in size from pores in the peripheral wall layer 12. FIG. 6 is a scanning electron photomicrograph showing crack-shaped voids appearing on the surface of the peripheral wall layer.

Though not particularly restricted, the shapes of the voids 21 are exemplified in FIGS. 7(a) to 7(f). The voids 21 shown in FIGS. 7(a) to 7(c) extend axially, and the voids 21 shown in FIGS. 7(d) and 7(e) extend axially and circumferentially. The voids 21 shown in FIG. 7(f) extend in a hexagonal pattern.

Figure 7A:
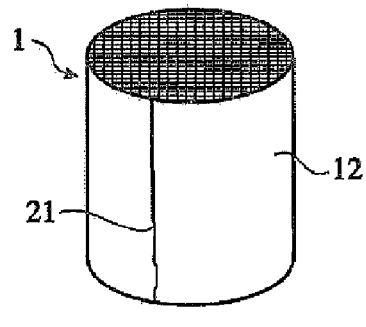
FIG. 7(a) is a perspective view showing one example of voids axially extending in the peripheral wall layer of the ceramic honeycomb structure of the present invention.
Figure 7B:
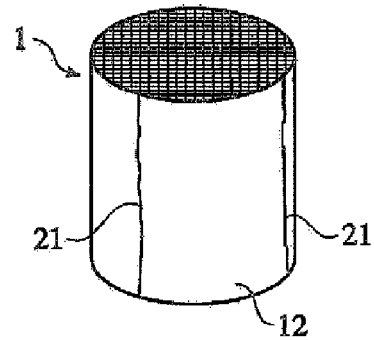
FIG. 7(b) is a perspective view showing another example of voids axially extending in the peripheral wall layer of the ceramic honeycomb structure of the present invention.
Figure 7C:
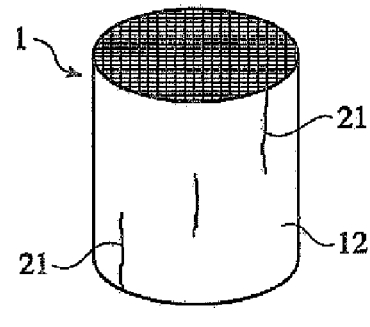
FIG. 7(c) is a perspective view showing a further example of voids axially extending in the peripheral wall layer of the ceramic honeycomb structure of the present invention.
Figure 7D:
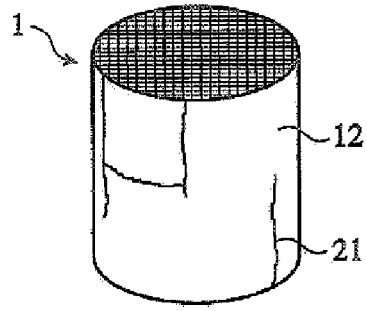
FIG. 7(d) is a perspective view showing a still further example of voids extending axially and circumferentially in the peripheral wall layer of the ceramic honeycomb structure of the present invention.
Figure 7E:
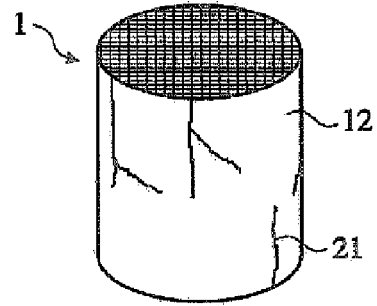
FIG. 7(e) is a perspective view showing a still further example of voids extending axially and circumferentially in the peripheral wall layer of the ceramic honeycomb structure of the present invention.
Figure 7F:
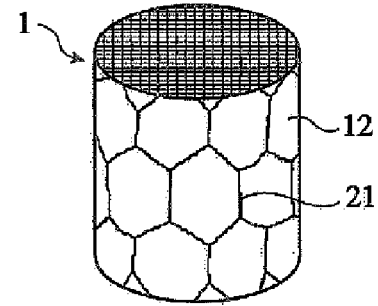
FIG. 7(f) is a perspective view showing a still further example of voids extending in a hexagonal pattern in the peripheral wall layer of the ceramic honeycomb structure of the present invention.

The total length of the voids 21 in one honeycomb structure 1 is preferably one time or more the full length of the ceramic honeycomb structure 1. Though a large number of voids 21 effectively release thermal shock stress, a circumferential component of the thermal shock stress can be released from the peripheral wall layer 12 of the honeycomb structure 1 throughout its full length, when the total length of the voids 21 is at least one time the full length of the ceramic structure. For instance, the total length of the voids 21 shown in FIG. 7(a) is about one time the full length of the ceramic honeycomb structure 1. In FIG. 7(c), the total length of plural lines of voids 21 is slightly larger than one time the full length of the ceramic honeycomb structure 1. When the total length of the voids 21 is three times or more the full length of the honeycomb structure 1, the thermal shock stress is released more effectively.

Figure 1A:
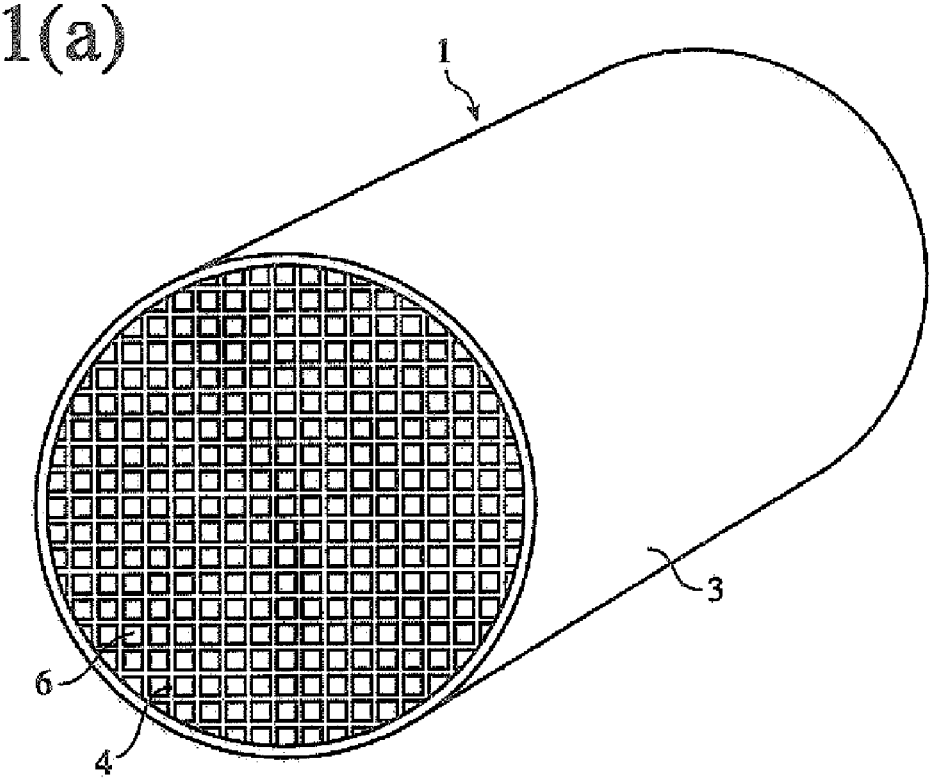
FIG. 1(a) is a perspective view showing a conventional ceramic honeycomb structure.
Figure 1B:
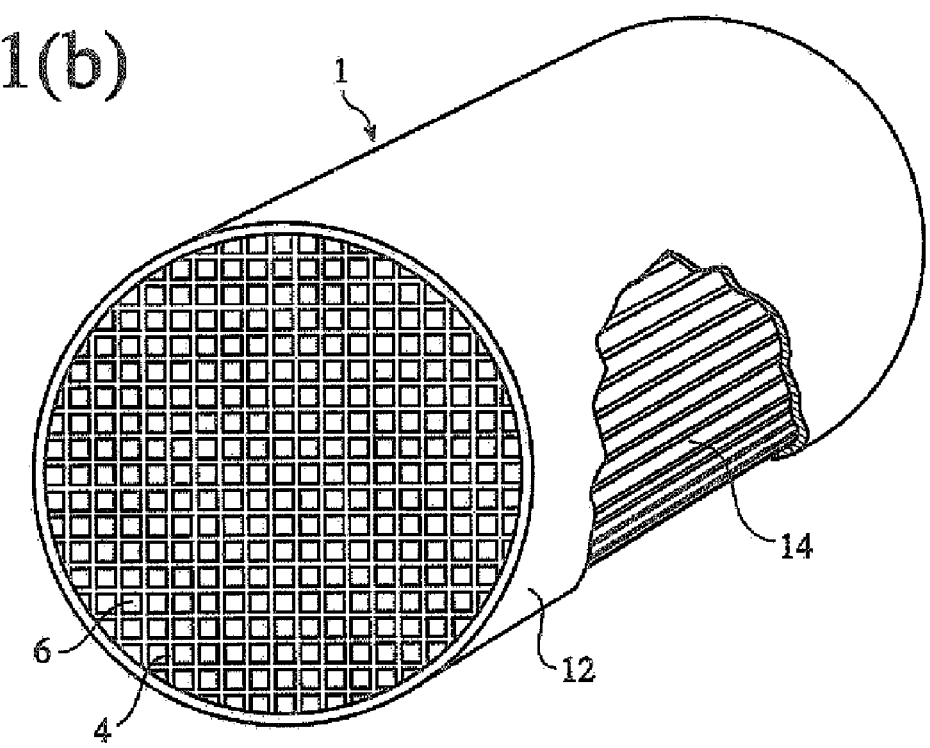
FIG. 1(b) is a partially broken perspective view showing the ceramic honeycomb structure of the present invention.
Figure 2:
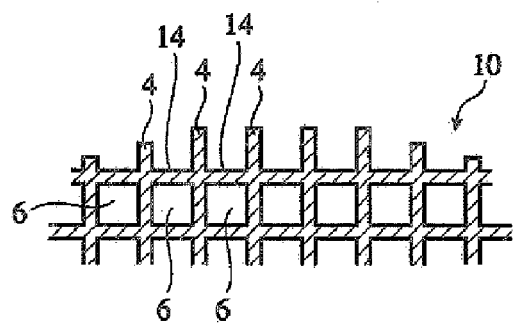
FIG. 2 is a partial cross-sectional view showing one example of a ceramic honeycomb body used in the present invention.
Figure 3:
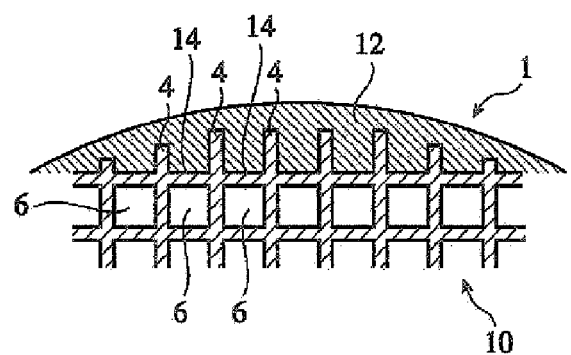
FIG. 3 is a partial cross-sectional view showing a ceramic honeycomb structure having a peripheral wall layer covering grooves of the ceramic honeycomb body shown in FIG. 2 without voids.
Figure 4:
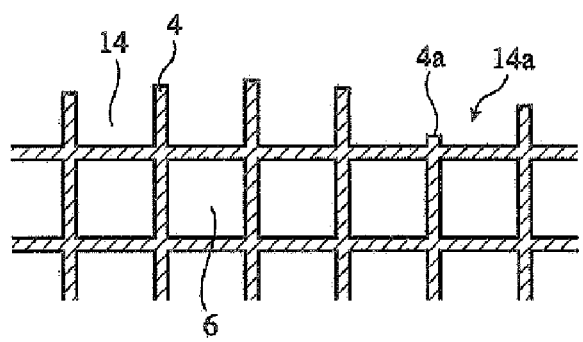
FIG. 4 is a partial cross-sectional view showing a conventional ceramic honeycomb body, in which part of cell walls is chipped after removal of the peripheral wall.
Figure 8:
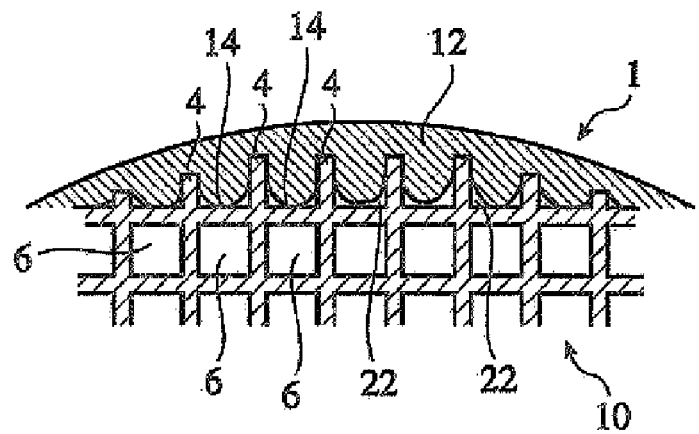
FIG. 8 is a partial cross-sectional view showing a ceramic honeycomb structure having voids between a peripheral wall layer and grooves.
Figure 9:
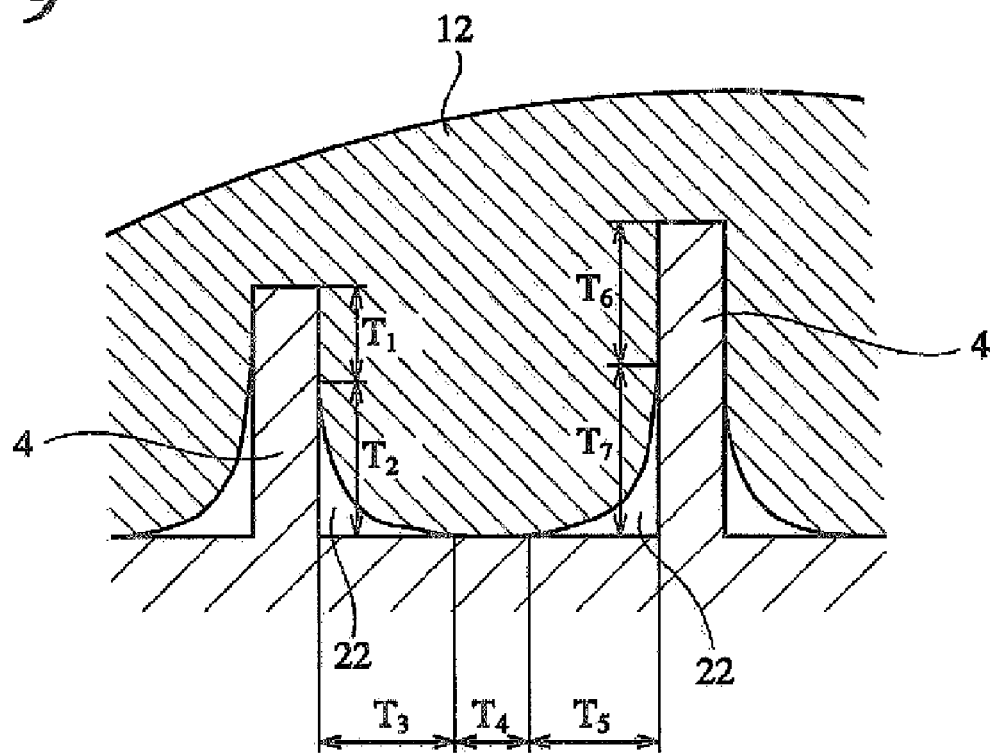
FIG. 9 is an enlarged partial cross-sectional view showing the voids shown in FIG. 8.

Stress release portions formed between the peripheral wall layer 12 and the grooves 14 are, for instance, voids 22 between the peripheral wall layer 12 and the grooves 14 as shown in FIGS. 8 and 9. As shown in FIG. 8, the voids 22 are space at corners of the grooves 14, which are not filled with the peripheral wall layer 12. A thermal shock stress generated in the peripheral wall layer 12 by rapid heating by an exhaust gas is released more easily in the honeycomb structure having the voids 22 between the peripheral wall layer 12 and the grooves 14 than in the honeycomb structure having grooves filled up with the peripheral wall layer 12 to their corners without voids as shown in FIG. 3. Even if the peripheral wall layer 12 were cracked, cracks would not be likely to propagate into the cell walls 4. Because the voids 22 make the contact area between the peripheral wall layer 12 and the cell walls 4 smaller, a residual stress due to the difference in a thermal expansion coefficient between them can be reduced, thereby providing the honeycomb structure with higher resistance to cracking by thermal shock.

The more the number of the grooves 14 having the voids 22, the easier the thermal shock stress is released. Thus, the number of the grooves 14 having the voids 22 is preferably 5% or more, more preferably 20 to 90%, based on the total number of the grooves 14.

As shown in FIG. 9, the grooves 14 having the voids 22 are defined as those meeting the conditions that the total length of a contact portion of the grooves 14 with the peripheral wall layer 12, i.e. $T_1+T_4+T_6$, is 95% or less based on the total length of the grooves 14, i.e. $T_1+T_2+T_3+T_4+T_5+T_6+T_7$. The voids 22 between the peripheral wall layer 12 and the grooves 14 are preferably formed continuously in an axial direction of the honeycomb structure 1, because it can release thermal shock stress throughout the honeycomb structure 1. However, the voids 22 need not be uniform along the entire axial length.

In the case of a large honeycomb structure 1 having an outer diameter of 150 mm or more and a full length of 150 mm or more, it is easily cracked by thermal shock in the cell walls 4, because of a large temperature difference between a center portion and a surface layer. Accordingly, the stress release portions provide the ceramic honeycomb structure with a remarkably improved thermal shock resistance.

One example of a method for producing a ceramic honeycomb structure having voids 21 in a peripheral wall layer 12 comprises removing a peripheral wall 3 and cell walls 4 adjacent thereto from a ceramic honeycomb green or fired body, covering the resultant axial grooves 14 with a coating material composed of a ceramic aggregate and an inorganic binder, and charging the coated body into a drying furnace (for instance, 70° C. or higher) to rapidly dry the coating. Rapid vaporization of water in the coating material provides the peripheral wall layer 12 with crack-shaped voids 21 open on a surface thereof. Rapid drying produces the voids 21 because difference occurs in the water content between surface and interior portions of the coating, resulting in different volume shrinkage ratios between them. The coating material may be properly selected like the above-described material for the peripheral wall layer 12. The percentage of the voids 21 and the width and shape of their openings may be changed by adjusting the amount and kind of ceramic aggregates and inorganic or organic binders added, water content in the coating material, or the temperature of the drying furnace, etc. When the amounts of an inorganic binder and water added are increased, the generation of the voids 21 becomes easy. After drying the coating material, it may be fired, if necessary.

To produce the ceramic honeycomb structure 1 having the voids 22 between the peripheral wall layer 12 and the grooves 14, the peripheral wall 3 of the ceramic green or fired body having a honeycomb structure is removed to expose axial grooves 14, which are coated with a coating material having a viscosity of 20,000 cP or more and then dried. The ceramic honeycomb green or fired body may be fired, if necessary, before or after coated with the coating material. As in the method described in Japanese Patent 2,604,876, the applied coating material having a viscosity of 10,000 to 20,000 cP is likely to fill up the corners of the grooves 14 as shown in FIG. 3. However, a coating material having as high a viscosity as 20,000 cP or more is not likely to fill up the corners of the grooves 14 as shown in FIGS. 8 and 9, resulting in a ceramic honeycomb structure 1 having voids 22 between the peripheral wall layer 12 and the grooves 14. By adjusting the amount and kind of aggregates, an inorganic or organic binder and water added, etc., the viscosity of the coating material can be made as high as 20,000 cP or more. The coating material may be fired after dried, if necessary.

[2] Second Embodiment

The ceramic honeycomb structure according to the second embodiment comprises a ceramic honeycomb body having grooves axially extending on its outer surface and cell walls constituting a large number of flow paths inside the grooves, and a peripheral wall layer covering the grooves, a thermal expansion coefficient of the peripheral wall layer being smaller than those of the cell walls in a radial direction. When the peripheral wall layer made of a coating material having a smaller thermal expansion coefficient than those of the cell walls is cooled to room temperature after drying or firing, a compressive stress remains in the peripheral wall layer, while a tensile stress remains in the cell walls, because of the difference in a thermal expansion coefficient between the cell walls and the peripheral wall layer. Therefore, even if the ceramic honeycomb structure has a higher temperature in a center portion than in a peripheral wall layer particularly at the time of starting operation, the compressive stress prevents the peripheral wall layer from being cracked.

It is preferable that the thermal expansion coefficient of the peripheral wall layer is smaller by $0.1 \times 10^{-7}/°C$. or more than those of the cell walls in a radial direction. In the case of a cordierite honeycomb structure, the thermal expansion coefficient of the cell walls in a radial direction is about 10.1 to $20.0 \times 10^{-7}/°C$. Accordingly, if the thermal expansion coefficient of the peripheral wall layer were about $10.0 \times 10^{-7}/°C$. or less, it would be able to prevent cracking from occurring in the peripheral wall layer due to the difference in thermal expansion by the temperature difference between the peripheral wall layer and the center portion in the honeycomb structure during usual use. The thermal expansion coefficient of the peripheral wall layer is preferably $9.0 \times 10^{-7}/°C$. or less ($1.0 \times 10^{-7}/°C$. or more smaller than those of the cell walls), more preferably $8.0 \times 10^{-7}/°C$. or less ($2.0 \times 10^{-7}/°C$. or more smaller than those of the cell walls) in a radial direction.

The use of the coating material containing amorphous silica particles having as low a thermal expansion coefficient as $10.0 \times 10^{-7}/°C$. or less, and an amorphous oxide matrix having high strength and excellent bonding with amorphous silica particles provides the peripheral wall layer with a smaller thermal expansion coefficient than those of the cell walls. Because aggregates composed of amorphous silica particles have higher hardness than that of the cordierite aggregates described in Japanese Patents 2,604,876 and 2,613,729, the peripheral wall layer can be provided with high hardness.

All ceramic particles (aggregates) of the peripheral wall layer need not be amorphous silica particles. 50% or more by mass of the amorphous silica particles provide the peripheral wall layer with a low thermal expansion coefficient. In addition, when the amorphous silica particles have an average particle size of 1 to 100 μm, the peripheral wall layer having excellent strength and thermal shock resistance can be obtained. When the average particle size of the amorphous silica particles is less than 1 μm, a large amount of the amorphous oxide matrix for binding amorphous silica particles are required, providing the peripheral wall layer with too low a thermal shock resistance. On the other hand, when the average particle size of the amorphous silica particles exceeds 100 μm, the strength of the peripheral wall layer is lowered. The more preferred average particle size of the silica particles is 5 to 40 μm.

The amorphous silica particles preferably have a shape as close to a sphere as possible. For instance, when the aspect ratio (ratio of major axis/minor axis) of the amorphous silica particles is 20 or less, the amorphous silica particles have a small surface area, requiring only a small amount of the amorphous oxide matrix to bond the amorphous silica particles, thereby making it possible to provide the peripheral wall layer with an excellent thermal shock resistance. The aspect ratio of the amorphous silica particles is preferably 10 or less, more preferably 5 or less.

In the case of the production of a honeycomb structure made of cordierite, a soft ceramic material comprising a cordierite-forming material is shaped by extrusion to produce a green body having an integral honeycomb structure constituted by cell walls and a peripheral wall, and the green body is fired. However, in the extruded green body integrally having a peripheral wall and cell walls, the peripheral wall is thicker than the cell walls, and the degree of orientation of cordierite crystals is lower in the peripheral wall than in the cell walls, so that the thermal expansion coefficient of the peripheral wall is equal to or higher than those of the cell walls. Accordingly, it is preferable that after the peripheral wall integral with the cell walls is completely removed by machining, a peripheral wall layer having a smaller thermal expansion coefficient than those of the cell walls is formed.

By forming a peripheral wall layer by applying a coating material to axial grooves exposed on the outer side surface of the honeycomb body, the honeycomb body and the peripheral wall layer can be strongly bonded to each other. Also, by removing cell walls having deformed outer walls the honeycomb structure can be provided with high mechanical strength. In addition, even when the fired honeycomb structure entirely has low roundness, it is provided with improved dimensional accuracy, because the peripheral wall layer is formed after being provided with increased roundness by grinding.

Though the removal of the peripheral wall may be carried out either in a state of a honeycomb green body or in a state of a fired body, it is preferably carried out on a dried honeycomb green body from the aspect of reducing the working cost, or on a fired body from the aspect of securing the dimensional accuracy. In the case of a coating material containing amorphous silica particles and an amorphous ceramic matrix, it has a lower melting point than those of ceramics (cordierite, etc.) forming the ceramic honeycomb body. Accordingly, it is preferable that the coating material is applied to the honeycomb body fired after removing the peripheral wall, and that the coated honeycomb is then dried and fired. Thus formed is a peripheral wall layer fixed to the grooves strongly and having an excellent thermal shock resistance due to a smaller thermal expansion coefficient than those of the cell walls.

The coating material for the peripheral wall layer preferably comprises 100 parts by mass of the amorphous silica particles and 2 to 35 parts by mass of an amorphous oxide matrix. When the amorphous oxide matrix is less than 2 parts by mass, the amorphous silica particles cannot be strongly bonded. On the other hand, when the amorphous oxide matrix exceeds 35 parts by mass, the peripheral wall layer is likely to be cracked at the time of drying or firing, or by thermal shock. Oxide colloids composed of colloidal silica and/or colloidal alumina are suitable for the amorphous ceramic matrix because of the effect of improving coatability. The coating material for the peripheral wall layer may contain ceramic fibers, cement, etc., and further an organic binder, etc.

The peripheral wall layer composed of amorphous silica particles and an amorphous oxide matrix formed from colloidal silica and/or colloidal alumina preferably contains 70% or more by mass of $SiO_2$, and may further contain proper amounts $Al_2O_3$, $MgO$, $Fe_2O_3$, $TiO_2$, $Na_2O$, $K_2O$, $CaO$, etc. The $SiO_2$ content is preferably 80% or more by mass, more preferably 90% or more by mass.

After removing the peripheral wall of the cordierite honeycomb green or fired body by machining, a peripheral wall layer formed from a coating material comprising 100 parts by mass of amorphous silica particles and 2 to 35 parts by mass (on a solid basis) of an amorphous oxide matrix (preferably colloidal silica and/or colloidal alumina) is formed to obtain a ceramic honeycomb structure whose peripheral wall layer is resistant to cracking not only when used for exhaust gas-cleaning catalytic converters and particulate-capturing filters, which are subjected to a large thermal shock, but also while handling. The coating material may contain ceramic fibers, cement, etc. and further an organic binder, etc, in addition to the above basic components. Further, after forming the peripheral wall layer, an oxide colloid such as colloidal silica and/or colloidal alumina, etc. may be applied to the surface of the peripheral wall layer.

[3] Third Embodiment

In the third embodiment, the peripheral wall and the nearby cell walls of the honeycomb green body is removed before firing. Because the peripheral wall and the cell walls have high hardness after firing, the cutting of the peripheral wall and the nearby cell walls is likely to cause chipping in the cell walls and takes a lot of time. On the other hand, because the peripheral wall and the cell walls are easily cut because of low hardness before firing, the removal of the peripheral wall and the nearby cell walls by cutting can be carried out in a short period of time without chipping in the cell walls.

When the peripheral wall 3 is removed from the dried green body having a honeycomb structure, the cell walls 4 are resistant to chipping 4a during removing the peripheral wall 3 of the fired body, thereby sufficiently keeping an contact area between the cell walls 4 and the peripheral wall layer 12. Further, when the peripheral wall 3 is removed at the stage of the dried green body, it can be cut away, thereby shortening the working time. Because cutting tools such as cemented carbide cutting tools, etc. can be used in place of a diamond grinder wheels, the working cost can be reduced.

Figure 13A:
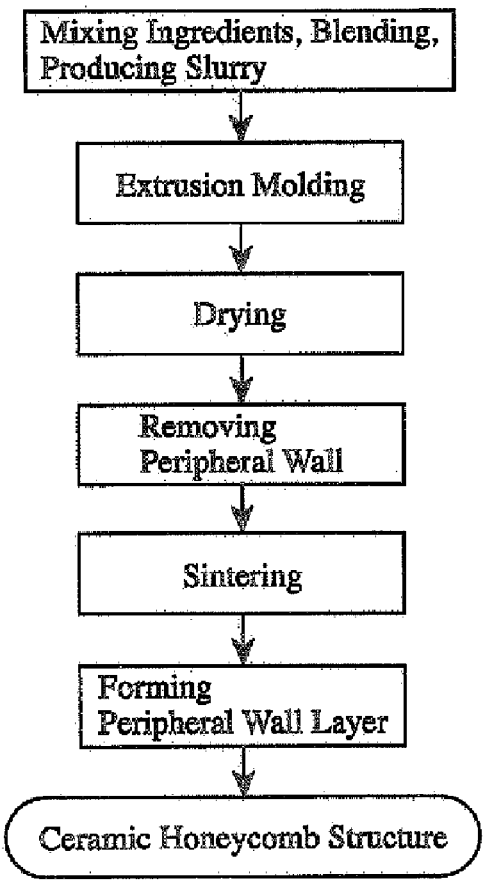
FIG. 13(a) is a flow chart showing one example of the steps of producing the ceramic honeycomb structure of the present invention.
Figure 13B:
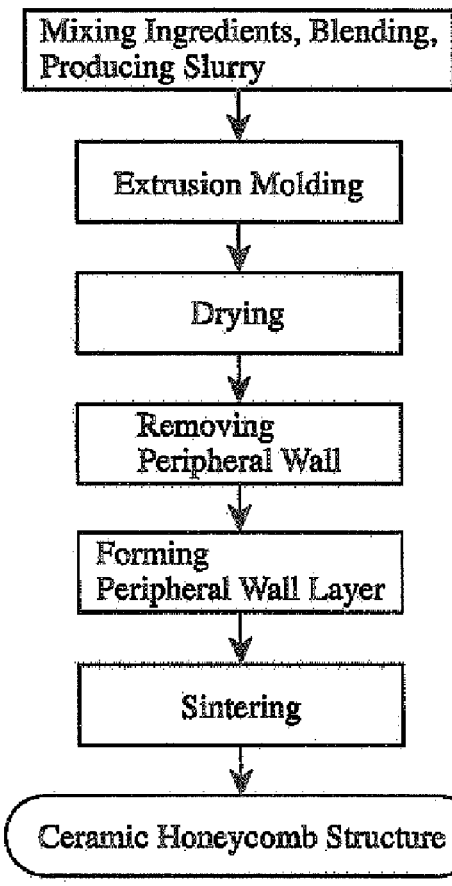
FIG. 13(b) is a flow chart showing another example of the steps of producing the ceramic honeycomb structure of the present invention.

After the peripheral wall 3 is removed from the dried ceramic honeycomb green body, a coating material is applied to the grooves 14 before or after the firing (see FIGS. 13(*a*) and 13(*b*)), and then dried and fired, to form a peripheral wall layer 12 integral with the grooves 14. Because this peripheral wall layer 12 is resistant to peeling off from the honeycomb body 10, the honeycomb structure has excellent isostatic strength.

It should be noted that when the term "peripheral wall" is simply used herein, it includes not only the peripheral wall of the honeycomb green or fired body but also the nearby cell walls thereof unless otherwise mentioned. When the cell walls 4 near the peripheral wall 12 are removed, preferably at least two cells, more preferably 3 to 4 cells, are removed from the periphery.

After removing the peripheral wall, the dried ceramic honeycomb green body may be fired, and its exposed peripheral surface may be finish-worked and then formed with a peripheral wall layer 12. Alternatively, after removing the peripheral wall 3 from the ceramic honeycomb green body, the peripheral wall layer 12 may be formed, and a peripheral surface of the peripheral wall layer 12 may be worked depending on applications.

When firing is conducted after the coating material is applied to the grooves 14, the dimensional changes of these parts by firing can be made identical, thereby making them integral with each other while preventing cracking by firing. In this case, there is particularly preferably large bonding strength between the cell walls 4 and the peripheral wall layer 12.

Figure 10A:
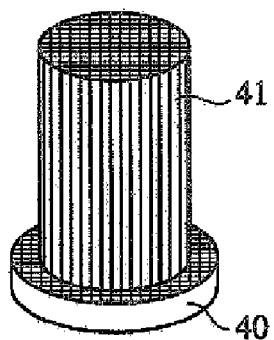
FIG. 10(a) is a perspective view showing a state where a honeycomb green body having a peripheral wall removed is placed on a table.
Figure 10B:
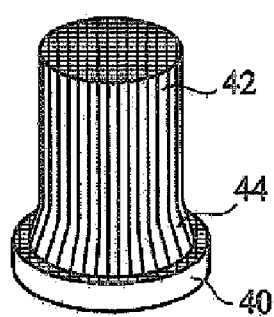
FIG. 10(b) is a perspective view showing the honeycomb green body of FIG. 10(a) after firing.
Figure 10C:
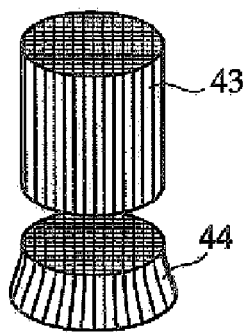
FIG. 10(c) is a perspective view showing a state where a large-diameter portion close to the table is cut away from the fired honeycomb shown in FIG. 10(b)

As shown in FIG. 10, in the firing of the ceramic honeycomb green body 41, the green body 41 is placed on a table 40 such that a longitudinal end of the ceramic honeycomb green body 41 abuts a table 40, and a large-diameter portion 44 of the ceramic honeycomb body 42 in contact with the table 40 is cut off after firing, to obtain a honeycomb body 43 having a uniform outer diameter, which provides a honeycomb structure with a peripheral wall layer having a uniform thickness.

In the course of a firing reaction of ceramics, dimensional decrease generally occurs. There is no problem when the dimensional decrease occurs uniformly in the overall honeycomb structure. However, in the case of a large ceramic honeycomb structure (for instance, 150 mm or more in an outer diameter, 150 mm or more in length) for cleaning an exhaust gas from diesel engines, the degree of dimensional decrease differs from portion to portion in the ceramic honeycomb structure depending on its materials. For instance, because an opening end of the honeycomb green body abutting the table is constrained by the table, it suffers from only small dimensional decrease.

Figure 12A:
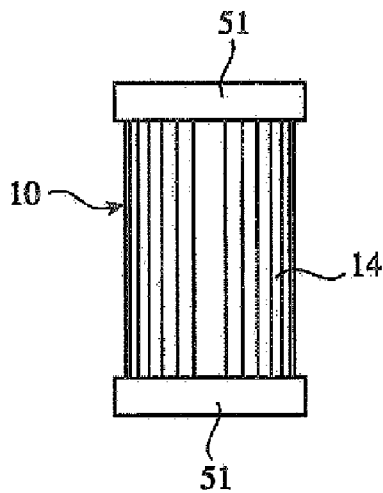
FIG. 12(a) is a side view showing a honeycomb body with grip members fixed to both ends thereof for forming a peripheral wall layer thereon.
Figure 12B:
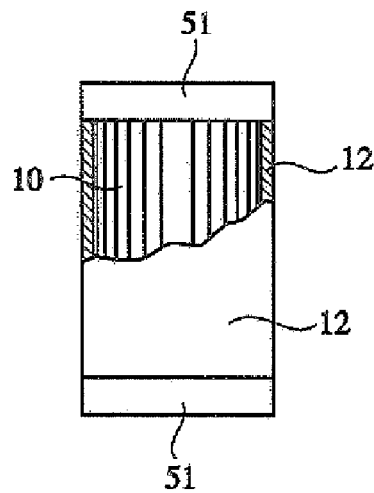
FIG. 12(b) is a partially broken side view showing a peripheral wall layer formed on the honeycomb body shown in FIG. 12(a)

Though the dried green body 41 has a uniform outer diameter as shown in FIG. 10(*a*), its opening end 44 abutting the table 40 is subjected to less diameter decrease by firing, resulting in poorer roundness than other portions, because of constraint by the table 40 as shown in FIG. 10(*b*). When the peripheral wall layer 12 having the same outer diameter as that of the disks 51, 51 is formed by coating the grooves 14 appearing on the fired ceramic honeycomb with a coating material, with both end portions of the fired ceramic honeycomb having a nonuniform outer diameter sandwiched by a pair of disks 51, 51 having a targeted outer diameter as shown in FIG. 12(*a*), the resultant peripheral wall layer 12 has a nonuniform thickness, so that the peripheral wall layer 12 is easily subjected to cracking due to thermal shock in a thick portion. Accordingly, it is preferable to remove an opening end 44 having a larger outer diameter, thereby making the outer diameter of the fired ceramic honeycomb 43 uniform as shown in FIG. 10(*c*).

The thickness of the peripheral wall layer of the honeycomb structure can also be made uniform by removing the peripheral wall according to the predicted diameter decrease by firing. For instance, when the green body 45 is worked to a shape shown in FIG. 11(*a*) (a portion 47 abutting the table 40 has a reduced diameter), based on a dimensional change ratio determined on each portion of the honeycomb structure in the production of the fired body shown in FIG. 10(*b*) from the green body shown in FIG. 10(*a*), the fired body 46 with good dimensional accuracy can be obtained as shown in FIG. 11(*b*). Using this fired body, it is possible to produce a peripheral wall layer 12 having a uniform thickness with the disks 51, 51 shown in FIG. 12.

When the honeycomb structure has different cross section shapes in a longitudinal direction, for instance, when a green body having a circular cross section is turned to a fired body having substantially an elliptical cross section, the extent of cutting the peripheral wall of the ceramic green body can be determined, based on the dimensional change ratio measured by a three-dimensional meter in the production of a fired body from a green body, and the green body can be worked based on the above extent of cutting by a three-dimensional machining apparatus, etc.

In any of the above first to third ceramic honeycomb structures, the cell walls 4 preferably have a porosity of 50 to 80%. When the cell walls 4 have a porosity of 50% or more, materials forming the peripheral wall layer 12 easily penetrate into the pores of the cell walls 4, resulting in a so-called large anchoring effect. Because the peripheral wall layer 12 and the grooves 14 are integrally bonded by the anchoring effect, the honeycomb structure 1 has a large mechanical strength. However, when the porosity exceeds 80%, the strength of the cell walls 4, thus the mechanical strength such as isostatic strength, etc. of the honeycomb structure 1, is too low. As the mechanical strength such as isostatic strength, etc. decreases, the honeycomb structure 1 becomes easily broken by mechanical stress such as engine vibration, road surface vibration, etc., in a case where it is used as a catalyst carrier or a particulate-capturing filter.

The cell walls 4 preferably have an average pore size of 10 to 50 μm. When the average pore size is 10 μm or more, the materials forming the peripheral wall layer 12 easily penetrate into the pores of the cell walls 4, resulting in a large anchoring effect. However, when the average pore size exceeds 50 μm, the strength of the cell walls 4 undesirably decreases.

When the peripheral wall layer 12 and the grooves 14 are strongly fixed to each other with the above conditions of porosity and an average pore size met by the cell walls 4, the ceramic honeycomb structures described in Japanese Patents 2,604,876 and 2,613,729 would have a low thermal shock resistance, while the decrease of the thermal shock resistance of the ceramic honeycomb structure 1 having stress release portions would be suppressed. To prevent the decrease of the mechanical strength of the cell walls 4 of the honeycomb structure 1, it is preferable not only to adjust the porosity and the average pore size, but also to reduce the concentration of stress in large pores by making the cross sections of the pores of the cell walls 4 substantially circular.

To use the ceramic honeycomb structure of the present invention mainly as a catalyst carrier for cleaning an exhaust gas or a filter for removing particulates from an exhaust gas from diesel engines, soft ceramic materials having excellent heat resistance are preferably used at least for a ceramic honeycomb body. It is particularly preferable to use at least one soft ceramic material selected from the group consisting of cordierite, alumina, mullite, silicon nitride, silicon carbide and LAS. Most preferable among them is cordierite because it is inexpensive and excellent in heat resistance and chemical resistance with a low thermal expansion.

In the case of the ceramic honeycomb structure having the stress release portions, the thermal expansion coefficients of the grooves 14 and the peripheral wall layer 12 need not necessarily be identical because of the improved thermal shock resistance. In this case, the peripheral wall layer 12 may be formed, for instance, by a coating material comprising heat-resistant ceramic aggregates such as cordierite, silica, alumina, mullite, silicon carbide, silicon nitride, etc., an inorganic binder, and if necessary, ceramic fibers, an organic binder, cement, etc.

The cell walls 4 of the ceramic honeycomb structure 1 preferably have a thickness of 0.1 to 0.5 mm. Particularly, in the case of a large honeycomb structure having an outer diameter exceeding 150 mm, the strength of the cell walls 4 is insufficient with a thickness less than 0.1 mm. On the other hand, when the thickness of the cell walls 4 exceeds 0.5 mm, an exhaust gas-passing resistance (pressure loss) of the cell walls 4 becomes large. The thickness of the cell walls 4 is more preferably 0.2 to 0.4 mm.

The cell walls 4 preferably have a pitch of 1.3 mm or more. When the pitch is less than 1.3 mm, the cell opening area of the honeycomb structure 1 is too small, increasing the pressure loss of the honeycomb filter 1 and thus decreasing an engine power.

When the ceramic honeycomb body 10 has an isostatic strength of 1.0 MPa or more, the peripheral wall layer 12 does not easily peel off from the honeycomb body 10, thereby securing a proper holding force in a container (not shown), and thus making it unlikely that the honeycomb structure 1 is damaged by moving in the container. The ceramic honeycomb body 10 more preferably has an isostatic strength of 1.5 MPa or more.

The present invention will be explained in further detail by the following Examples without intention of restricting the present invention thereto. The chemical compositions of materials used in the following Examples and Comparative Examples are shown in Table 1.

TABLE 1

| Component | Chemical Composition (% by mass) | | | | | | | |
|---|---|---|---|---|---|---|---|---|
| | $SiO_2$ | $Al_2O_3$ | MgO | $Na_2O$ | $K_2O$ | CaO | $Fe_2O_3$ | $TiO_2$ |
| Amorphous Silica Particles A | ≧99.5 | 0.08 | — | 0.003 | 0.002 | — | 0.001 | — |
| Amorphous Silica Particles B | ≧99.5 | 0.02 | — | 0.004 | 0.002 | — | 0.002 | — |
| Quartz | 99.6 | 0.1 | 0.05 | 0.05 | 0.03 | 0.02 | 0.03 | 0.02 |
| Cordierite Particles A[(1)] | 50.3 | 33.1 | 13.7 | 0.4 | — | 0.1 | 0.8 | 0.2 |
| Cordierite Particles B[(2)] | 50.1 | 33.2 | 13.8 | 0.4 | — | 0.1 | 0.9 | 0.2 |
| Colloidal Silica[(3)] | 98 | ≦0.1 | ≦0.1 | 0.5 | — | ≦0.1 | — | — |
| Colloidal Alumina[(4)] | ≦0.1 | 99 | ≦0.1 | 0.3 | — | ≦0.1 | — | — |

Note:
[(1)]Porosity: 35%.
[(2)]Porosity: 65%.
[(3)]Solid content: 50% by mass.
[(4)]Solid content: 30% by mass.

In each Example and Comparative Example, the porosity and average pore size of the ceramic honeycomb body were measured by a mercury penetration method on test pieces cut out therefrom. The thermal expansion coefficient of each ceramic honeycomb structure is an average value of thermal expansion coefficients between room temperature and 800° C.

The method for measuring a thermal shock resistance temperature comprises keeping each ceramic honeycomb structure in an electric furnace at a temperature of room temperature +400° C. for 30 minutes, quenching it to room temperature, and then observing by the naked eye whether or not the cell walls of the ceramic honeycomb structure are cracked on both longitudinal end surfaces, and if there are no cracks in the cell walls, elevating the temperature of the electric furnace stepwise each by 25° C., to repeat the measurement until cracking occurs. The thermal shock resistance temperature is a difference between a temperature at which cracking starts to occur and room temperature.

The method for measuring isostatic strength comprises charging each ceramic honeycomb structure into a pressure container with 20-mm-thick aluminum plates abutting both longitudinal end surfaces of the ceramic honeycomb structure to seal both ends thereof and with a 2-mm-thick rubber closely attaching to the peripheral wall layer surface of the ceramic honeycomb structure, and introducing water into the pressure container to apply a hydrostatic pressure to the ceramic honeycomb structure, according to the automobile standards (JASO) of the Society of Automotive Engineers of Japan, Inc. The isostatic strength is a pressure (MPa) when each ceramic honeycomb structure is broken.

EXAMPLES 1 TO 6

A cordierite-forming material powder comprising kaolin powder, talc powder, silica powder and alumina powder as main components was prepared. The material powder contained 48 to 52% by mass of $SiO_2$, 33 to 37% by mass of $Al_2O_3$, and 12 to 15% by mass of MgO as main components, and further a binder such as methylcellulose, hydroxypropylmethylcellulose, etc., a lubricant, and graphite (a pore-forming agent). After mixing the cordierite-forming material powder sufficiently in a dry state, the predetermined amount of water was added, and the resultant mixture was sufficiently kneaded to form a plastic soft ceramic material.

The soft ceramic material was shaped by extrusion to form a honeycomb green body integrally having a peripheral wall 3 and cell walls 4, and then drying and firing the honeycomb green body to form a fired cordierite honeycomb having an outer diameter of 280 mm and a full length of 300 mm. The cell walls of each fired body had a porosity of 65%, an average pore size of 20 µm, a thickness of 0.3 mm, a pitch of 1.5 mm and a thermal expansion coefficient of $10.5 \times 10^{-7}/°$ C. in a radial direction. A peripheral wall was removed from each fired cordierite honeycomb by a cylindrical grinder to form a ceramic honeycomb body 10 (an outer diameter of 265.7 mm, a length of 300 mm) having axial grooves.

100 parts by mass of cordierite powder A (an average particle size of 10 µm) was formulated with 10 to 15 parts by mass (on a solid basis) of colloidal silica, and 1.2 parts by mass of methylcellulose was further added to the total (100 parts by mass) of the cordierite powder A and the colloidal silica, and kneaded with water to form a coating material having a viscosity of 15,000 to 19,000 cP.

After applying the above coating material to the grooves 14 appearing on a peripheral surface of the honeycomb body 10, it was dried by a hot air in a drying furnace at various temperatures shown in Table 2. Thereafter, it was heated to 450° C. to remove methylcellulose by decomposition, thereby providing a ceramic honeycomb structure having an outer diameter of 266.7 mm and a full length of 300 mm, which integrally had the grooves 14 and the peripheral wall layer 12. Because the viscosity of the coating material was adjusted to 15,000 to 19,000 cP, the peripheral wall layer 12 penetrated into the corners of the grooves 14. However, because each ceramic honeycomb structure was heated in a drying furnace at 70° C. to 120° C. immediately after filling the coating material, meandering crack-shaped voids 21 were generated in the peripheral wall layer 12.

The voids 21 in the peripheral wall layer 12 of each ceramic honeycomb structure 1 were observed by the naked eye, to calculate the length of each observed voids 21 by approximation to a straight line, and the total length of the voids 21 in one ceramic honeycomb structure 1 was then calculated. With the calculated value, a ratio of the total length of the voids 21 to the full length of the honeycomb structure 1 was calculated. Each ceramic honeycomb structure 1 was measured with respect to a thermal shock resistance temperature and an isostatic strength. The results are shown in Table 2.

TABLE 2

| | Coating Materials | | | | |
| | Aggregate (100 parts by mass) | Inorganic Binder | | | |
| No. | | Type | Amount (parts by mass) | Viscosity (cP) | Drying Conditions |
| --- | --- | --- | --- | --- | --- |
| Example 1 | Cordierite Particles A | Colloidal Silica | 10 | 15,000 | 70° C. 12 hours |
| Example 2 | Cordierite Particles A | Colloidal Silica | 10 | 15,000 | 80° C. 12 hours |
| Example 3 | Cordierite Particles A | Colloidal Silica | 10 | 15,000 | 100° C. 12 hours |
| Example 4 | Cordierite Particles A | Colloidal Silica | 10 | 15,000 | 110° C. 12 hours |
| Example 5 | Cordierite Particles A | Colloidal Silica | 10 | 15,000 | 120° C. 12 hours |
| Example 6 | Cordierite Particles A | Colloidal Silica | 15 | 19,000 | 120° C. 12 hours |

| | Voids in Peripheral Wall Layer | | | |
| No. | Shape (FIG. 7) | Total Length of Voids/Full Length of Honeycomb Structure | Thermal Shock Resistance Temperature (° C.) | Isostatic Strength (MPa) |
| --- | --- | --- | --- | --- |
| Example 1 | (c) | 0.7 | 500 | 2.2 |
| Example 2 | (a) | 1.8 | 550 | 2.1 |
| Example 3 | (b) | 3.9 | 575 | 1.9 |
| Example 4 | (c) | 4.2 | 575 | 2.0 |
| Example 5 | (d) | 6.2 | 600 | 1.7 |
| Example 6 | (f) | 21.8 | 625 | 1.4 |

Because each ceramic honeycomb structure 1 had voids 21 in the peripheral wall layer 12, a thermal shock stress was released from the ceramic honeycomb structure 1 to prevent cracking due to thermal shock in the cell walls 4. Accordingly, the thermal shock resistance temperature was 550 to 625° C. in each Example. Because the peripheral wall layer 12 filled the axial directional grooves 14, the isostatic strength exceeded 1 MPa, causing no problem in a practical use. It was found that the larger the ratio of the total length of the voids 21 to the full length of the honeycomb structure 1, the higher the thermal shock resistance temperature. It was also confirmed that when the total length of the voids 21 was equal to or more than the full length of the honeycomb structure 1, the honeycomb structure 1 had a high thermal shock resistance temperature.

COMPARATIVE EXAMPLES 1 AND 2

The fired cordierite honeycomb of 265.7 mm in an outer diameter and 300 mm in a full length, which was produced in the same manner as in Example 1, was used as a ceramic honeycomb structure of Comparative Example 1 without forming a peripheral wall layer. Also, after removing a peripheral wall from the fired ceramic honeycomb of Comparative Example 1, a peripheral surface thereof was coated with a coating material having a viscosity of 15,000 cP, which comprised 100 parts by mass of cordierite powder A having an average particle size of 10 µm, and 10 parts by mass (on a solid basis) of colloidal silica, and further 1.2 parts by mass of methylcellulose per the total (100 parts by mass) of the cordierite powder A and the colloidal silica. Immediately thereafter, the ceramic honeycomb structure was dried in a drying furnace at 40° C. for 24 hours, and then dried in a drying furnace at 70° C. for 12 hours, and further heated to 450° C., to provide a ceramic honeycomb structure of Comparative Example 2 integrally having grooves 14 and a peripheral wall layer 12. The thermal shock resistance temperature and the isostatic strength of each ceramic honeycomb structure were measured in the same manner as in Example 1. The results are shown in Table 3.

TABLE 3

| No. | Comparative Example 1 | Comparative Example 2 |
|---|---|---|
| | Coating Material | |
| Aggregates | — | Cordierite Particles A 100 parts by mass |
| Inorganic Binder | — | Colloidal Silica 10 parts by mass |
| Viscosity (cP) | — | 15,000 |
| Drying Conditions | — | at 40° C. for 24 hours at 70° C. for 12 hours |
| Voids in Peripheral Wall Layer | — | None |
| Thermal Shock Resistance Temperature (° C.) | 650 | 400 |
| Isostatic Strength (MPa) | — | 2.5 |

The ceramic honeycomb structure 1 of Comparative Example 1 without a peripheral wall layer was free from a problem concerning the thermal expansion difference between the cell walls 4 and the peripheral wall layer 12. However, when a thermal shock exceeding 650° C. was applied, cracking occurred in the cell walls 4 by a thermal stress due to the temperature difference between a center portion and a surface portion, because of its large size. Because the ceramic honeycomb structure 1 of Comparative Example 1 did not have a peripheral wall layer, the rubber could not be closely fixed thereto, failing to measure its isostatic strength. In addition, because the honeycomb structure having no peripheral wall layer could not be substantially held in a metal container by a grip member, it could not be used as a catalyst carrier or a particulate-capturing filter.

Because a coating material having a viscosity of 15,000 cP was applied in Comparative Example 2, the peripheral wall layer 12 filled the corners of the grooves 14. However, because the drying temperature of the coating material was at first as low as 40° C., no voids were generated in the peripheral wall layer 12. Also, because the ceramic honeycomb structure 1 of Comparative Example 2 had a peripheral wall layer 12 strongly integrated with cell walls 4, it exhibited a higher isostatic strength than that of the ceramic honeycomb structure of Example 1. However, because it did not have portions for releasing thermal shock stress, its thermal shock resistance temperature was as low as 400° C.

EXAMPLES 7 TO 11

A ceramic honeycomb body 10 having an outer diameter of 265.7 mm and a full length of 300 mm, which had grooves on its periphery, was produced in the same manner as in Example 1. The cell walls of each ceramic honeycomb body 10 had a porosity of 65%, an average pore size of 20 μm, a thickness of 0.3 mm, a pitch of 1.5 mm and a thermal expansion coefficient of $10.5 \times 10^{-7}/°$ C. in a radial direction.

In addition, a coating material having a viscosity of 25,000 to 67,000 cP was produced by mixing 100 parts by mass of cordierite powder B having an average particle size of 20 μm with 10 parts by mass (on a solid basis) of colloidal silica and further methylcellulose and water in proper amounts and kneading them. The coating material was applied to the periphery of the honeycomb body 10, dried at 40° C. for 24 hours, and then dried at 70° C. for 12 hours. Because of a low initial drying temperature, no voids 21 were generated in the peripheral wall layer 12. The coated honeycomb body was heated to 450° C. to remove methylcellulose by decomposition, to produce a ceramic honeycomb structure having an outer diameter of 266.7 mm and a full length of 300 mm, in which grooves 14 were integral with a peripheral wall layer 12.

The thermal shock resistance temperature and isostatic strength of each ceramic honeycomb structure 1 were measured. Further, the peripheral wall layer 12 filled into the grooves 14 was observed on a longitudinal cross section of the honeycomb structure 1, to count the number of grooves 14 having voids 22 between the peripheral wall layer 12 and themselves among all the grooves 14. The results are shown in Table 4.

TABLE 4

| | Coating Material | | |
|---|---|---|---|
| No. | Aggregates (100 parts by mass) | Inorganic Binder (10 parts by mass) | Viscosity (cP) |
| Example 7 | Cordierite Particles B | Colloidal Silica | 25,000 |
| Example 8 | Cordierite Particles B | Colloidal Silica | 28,000 |
| Example 9 | Cordierite Particles B | Colloidal Silica | 50,000 |
| Example 10 | Cordierite Particles B | Colloidal Silica | 62,000 |
| Example 11 | Cordierite Particles B | Colloidal Silica | 67,000 |

| No. | Drying Conditions | Number of Grooves with Voids (%) | Thermal Shock Resistance Temp. (° C.) | Isostatic Strength (MPa) |
|---|---|---|---|---|
| Example 7 | at 40° C. for 24 hr. at 70° C. for 12 hr. | 2 | 475 | 2.5 |
| Example 8 | at 40° C. for 24 hr. at 70° C. for 12 hr. | 7 | 525 | 2.5 |
| Example 9 | at 40° C. for 24 hr. at 70° C. for 12 hr. | 49 | 575 | 2.3 |
| Example 10 | at 40° C. for 24 hr. at 70° C. for 12 hr. | 90 | 600 | 1.8 |
| Example 11 | at 40° C. for 24 hr. at 70° C. for 12 hr. | 97 | 600 | 1.5 |

As shown in Table 4, because each ceramic honeycomb structure of Examples 7 to 11 had voids 22 between the peripheral wall layer 12 and the grooves 14, even though cracking occurred due to a thermal shock stress in the peripheral wall layer 12, the cracking would not propagate into the cell walls 4 because the voids 22 released a thermal shock stress from the ceramic honeycomb structure. Therefore, as compared with the ceramic honeycomb structure 1 of Comparative Example 2, in which the grooves 14 were filled with a peripheral wall layer 12 to their corners, cracks due to thermal shock did not easily propagate into the cell walls 4, resulting in showing a high thermal shock resistance temperature. In addition, despite the voids 22 between the peripheral wall layer 12 and the grooves 14, the isostatic strength was as high as more than 1 MPa, a practically acceptable level.

It was found that the higher the percentage of the grooves 14 having voids 22, the higher the thermal shock resistance temperature, and that when the percentage of the grooves 14 having voids 22 was 5% or more, there was a large effect of improving the thermal shock resistance temperature.

EXAMPLES 12 TO 15

A honeycomb body 10 having an outer diameter of 265.7 mm and a full length of 300 mm, which had grooves on its periphery, was formed in the same manner as in Example 1. The cell walls of each honeycomb body 10 had a porosity of 65%, an average pore size of 20 μm, a thickness of 0.3 mm, a pitch of 1.5 mm and a thermal expansion coefficient of $10.5 \times 10^{-7}/°$ C. in a radial direction. The same coating material as in Comparative Example 2 except for having a viscosity of 52,000 cP was applied to a peripheral wall of each honeycomb body 10. The coated honeycomb body 10 was rapidly heated and dried by hot blast in a drying furnace at 70° C. or 100° C. as shown in Table 5. Thereafter, it was heated to 450° C. to remove methylcellulose by decomposition, to provide ceramic honeycomb structures of Examples 12 and 13 each having an outer diameter of 266.7 mm and a full length of 300 mm, in which grooves 13 were integral with a peripheral wall layer 12.

100 parts by mass of amorphous silica powder A having an average particle size of 15 μm was mixed with 7 parts by mass (on a solid basis) of colloidal silica, and further with 1.2 parts by mass of methylcellulose per the total (100 parts by mass) of the amorphous silica powder A and the colloidal silica, and then kneaded with water, to produce a coating material having a viscosity of 45,000 cP. The ceramic honeycomb structures of Examples 14 and 15 were produced in the same manner as in Examples 12 and 13 except for using the above coating material.

The thermal shock resistance temperature and isostatic strength of the ceramic honeycomb structures 1 of Examples 12 to 15 were measured in the same manner as in Example 1. The results are shown in Table 5. Table 5 also shows the shape of voids 21, the ratio of the total length of voids 21 to the full length of the honeycomb structure, the percentages of grooves 14 having voids 22 between the peripheral wall layer 12 and themselves among the overall grooves.

TABLE 5

| | Coating Material | | | | |
|---|---|---|---|---|---|
| | Aggregates | Inorganic Binder | | | |
| No. | (100 parts by mass) | Type | Amount (parts by mass) | Viscosity (cP) | Drying Conditions |
| Example 12 | Cordierite Particles A | Colloidal Silica | 10 | 52,000 | 70° C. 12 hours |
| Example 13 | Cordierite Particles A | Colloidal Silica | 10 | 52,000 | 100° C. 12 hours |
| Example 14 | Amorphous silica Particles A | Colloidal Silica | 7 | 45,000 | 70° C. 12 hours |
| Example 15 | Amorphous silica Particles A | Colloidal Silica | 7 | 45,000 | 100° C. 12 hours |

| | Voids | | | | |
|---|---|---|---|---|---|
| No. | Shape (FIG. 7) | Total Length of Voids/ Full Length of Honeycomb Structure | Grooves with Voids (%) | Thermal Shock Resistance Temp. (° C.) | Isostatic Strength (MPa) |
| Example 12 | (a) | 1.9 | 50 | 650 | 1.8 |
| Example 13 | (b) | 4.8 | 50 | 650 | 1.9 |
| Example 14 | (a) | 1.7 | 42 | 625 | 2.0 |
| Example 15 | (b) | 4.2 | 42 | 625 | 2.2 |

Shown in Table 5, because each ceramic honeycomb structure 1 of Examples 12 to 15 had voids 21 in a peripheral wall layer 12, and voids 22 between the peripheral wall layer 12 and grooves 14, these voids 21, 22 functioning to release thermal shock stress prevented cracks due to thermal shock from propagating into the cell walls 4. Accordingly, the ceramic honeycomb structures 1 of Examples 12 to 15 had higher thermal shock resistance temperatures than that of the ceramic honeycomb structure of Comparative Example 2. In addition, because of two types of voids (stress release portions) 21, 22 in the peripheral wall layer 12 and between the peripheral wall layer 12 and the grooves 14, the ceramic honeycomb structures of Examples 12 to 15 had higher thermal shock resistance temperatures than those of the honeycomb structures of Examples 1 to 6 and 7 to 11. With respect to the isostatic strength, it was as high as more than 1 MPa, a practically acceptable level, because of the peripheral wall layer 12 formed by applying a coating material to the axial grooves 14.

EXAMPLES 16 TO 19

A fired cordierite honeycomb produced in the same manner in Example 1 had cell walls, which had a porosity of 65%, an average pore size of 20 μm, a thickness of 0.3 mm, a pitch of 1.5 mm and a thermal expansion coefficient of $10.5 \times 10^{-7}/°$ C. in a radial direction, was deprived of a peripheral wall by a cylindrical grinder to provide a honeycomb body A having an outer diameter of 264.7 mm and a full length of 300 mm, which had grooves on its periphery. A peripheral surface of each honeycomb body A was coated with an coatable pasty material having the formulation shown in Table 6, which was kneaded with an organic binder and water, in a dry thickness of about 1 mm, and the coated layer was dried to provide a ceramic honeycomb structure 1 having an outer diameter of 266.7 mm and a full length of 300 mm.

The peripheral wall layer 12 of the ceramic honeycomb structure 1 was scratched by rotating a core hardness tester (type PKH) available from George Fischer Corporation by two rounds, and the depth of scratch (measure of surface hardness) in the peripheral wall layer 12 of each ceramic honeycomb structure 1 was measured by Quick Vision, a non-contact three-dimensional meter available from Mitsutoyo Corporation. The thermal shock resistance temperature was measured on three ceramic honeycomb structures 1 in each Example. Test pieces were cut out from the peripheral wall layer 12, to measure an average thermal expansion coefficient between 40° C. and 800° C. The results are shown in Table 6.

Because the peripheral wall layer 12 of each ceramic honeycomb structure 1 was composed of amorphous silica particles A and colloidal silica, the depth of scratch in the peripheral wall layer 12 was 0.45 mm or less, a practically acceptable level. Also, because the thermal expansion coefficient of the peripheral wall layer 12 was smaller than the thermal expansion coefficients ($10.5 \times 10^{-7}$/° C.) of the cell walls in a radial direction, the thermal shock resistance temperature was 550° C. or higher, a practically acceptable level.

EXAMPLES 20 TO 23

Each coating material produced in the same manner as in Examples 16 to 19 except for having the formulation shown in Table 6 was applied in a dry thickness of about 1 mm to the peripheral surface of the same honeycomb body A as in Examples 16 to 19, dried, and further fired at 850° C. for 2 hours, to provide a ceramic honeycomb structure 1 having an outer diameter of 266.7 mm and a full length of 300 mm.

With respect to each ceramic honeycomb structure 1, the depth of scratch, thermal expansion coefficient and thermal shock resistance temperature of the peripheral wall layer 12 were measured in the same manner as in Example 16. The results are shown in Table 6. Because any of the peripheral wall layers 12 of Examples 20 to 23 was composed of amorphous silica particles B and colloidal silica, its surface hardness (expressed by the depth of scratch) was 0.45 mm or less, a practically acceptable level. Also, because the thermal expansion coefficient of the peripheral wall layer 12 was smaller than the thermal expansion coefficients ($10.5 \times 10^{-7}$/° C.) of the cell walls in a radial direction, the thermal shock resistance temperature was 550° C. or higher, a practically acceptable level.

EXAMPLES 24 TO 27

A honeycomb green body having an outer diameter of 290 mm and a full length of 320 mm, which was produced in the same manner as in Example 16, was dried, deprived of a peripheral wall and both end portions by grinding and then fired, to provide a honeycomb body B having an outer diameter of 264.7 mm and a full length of 300 mm, which had grooves on its periphery. Each honeycomb body B was coated with a coating material in the same manner as in Examples 16 to 19 to provide a ceramic honeycomb structure 1.

With respect to each ceramic honeycomb structure 1, the depth of scratch, thermal expansion coefficient and thermal shock resistance temperature of the peripheral wall layer 12 were measured in the same manner as in Example 16. The results are shown in Table 6. Examples 24 to 27 were the same as Examples 16 to 19 except that the former removed the peripheral wall 3 before firing, and the depth of scratch in the peripheral wall layers 12 of their ceramic honeycomb structures 1 was 0.45 mm or less, a practically acceptable level. Because the thermal expansion coefficients of the peripheral wall layers 12 were smaller than the thermal expansion coefficients ($10.5 \times 10^{-7}$/° C.) of the cell walls in a radial direction in the ceramic honeycomb structures 1 of Examples 24 to 27, their thermal shock resistance temperatures were 550° C. or higher, a practically acceptable level.

EXAMPLES 28 AND 29

A honeycomb body A having an outer diameter of 264.7 mm and a full length of 300 mm was produced in the same manner as in Example 16. A ceramic honeycomb structure 1 having an outer diameter of 266.7 mm and a full length of 300 mm was produced in the same manner as in Examples 16 to 19 except for coating each honeycomb body A with a coating material having the formulation shown in Table 6.

With respect to each ceramic honeycomb structure 1, the depth of scratch, thermal expansion coefficient and thermal shock resistance temperature of the peripheral wall layer 12 were measured in the same manner as in Example 16. The results are shown in Table 6. The coating material of Example 28 was composed of 100 parts by mass of mixed particles comprising 90% by mass of amorphous silica particles A and 10% by mass of quartz particles and 7 parts by mass of colloidal silica. The coating material of Example 29 was composed of 100 parts by mass of amorphous silica particles A and 7 parts by mass of colloidal alumina. Accordingly, in any of the ceramic honeycomb structures 1, the depth of scratch in the peripheral wall layer 12 was 0.45 mm or less, a practically acceptable level. Also, because the thermal expansion coefficient of the peripheral wall layer 12 was smaller than the thermal expansion coefficients ($10.5 \times 10^{-7}$/° C.) of the cell walls in a radial direction, the thermal shock resistance temperature was 550° C. or higher, a practically acceptable level.

COMPARATIVE EXAMPLE 3

A honeycomb structure integrally having a peripheral wall 3 and cell walls 4, which was produced in the same manner as in Example 16, was dried and fired without removing the peripheral wall, to provide a honeycomb body C having an outer diameter of 280 mm and a full length of 300 mm. The cell walls of this ceramic honeycomb body C had a porosity of 65%, an average pore size of 20 μm, a thickness of 0.3 mm, a pitch of 1.5 mm and a thermal expansion coefficient of $10.5 \times 10^{-7}$/° C. in a radial direction. With respect to this ceramic honeycomb body C, the depth of scratch, thermal expansion coefficient and thermal shock resistance temperature of the peripheral wall 3 were measured in the same manner as in Example 16. The results are shown in Table 6. Because the peripheral wall 3 was integral with the cell walls 4 in this ceramic honeycomb structure, the depth of scratch of the peripheral wall 3 was 0.45 mm or less, a practically acceptable level. However, because the thermal expansion coefficient of the peripheral wall 3 was larger than the thermal expansion coefficients ($10.5 \times 10^{-7}$/° C.) of the cell walls 4 in a radial direction, the thermal shock resistance temperature was lower than 550° C.

TABLE 6

| No. | Formulation of Coating Material (parts by mass) | | | | | | |
|---|---|---|---|---|---|---|---|
| | Amorphous Silica A[(1)] | Amorphous Silica B[(2)] | Quartz[(3)] | Cordierite A[(4)] | Cordierite B[(5)] | Colloidal Silica[(6)] | Colloidal Alumina[(6)] |
| Ex. 16 | 100 | — | — | — | — | 2.5 | — |
| Ex. 17 | 100 | — | — | — | — | 7 | — |
| Ex. 18 | 100 | — | — | — | — | 14 | — |
| Ex. 19 | 100 | — | — | — | — | 30 | — |
| Ex. 20 | — | 100 | — | — | — | 2.5 | — |
| Ex. 21 | — | 100 | — | — | — | 7 | — |
| Ex. 22 | — | 100 | — | — | — | 14 | — |
| Ex. 23 | — | 100 | — | — | — | 30 | — |
| Ex. 24 | 100 | — | — | — | — | 2.5 | — |
| Ex. 25 | 100 | — | — | — | — | 7 | — |
| Ex. 26 | 100 | — | — | — | — | 14 | — |
| Ex. 27 | 100 | — | — | — | — | 30 | — |
| Ex. 28 | 90 | — | 10 | — | — | 7 | — |
| Ex. 29 | 100 | — | — | — | — | — | 7 |
| Com. Ex. 3 | — | — | — | — | — | — | — |

| No. | Honeycomb Body | Properties of Peripheral Wall Layer or Peripheral Wall | | Thermal Shock Resistance Temperature (° C.) of Honeycomb Structure |
|---|---|---|---|---|
| | | Depth of Scratch (mm) | Thermal Expansion Coefficient ($\times 10^{-7}$/° C.) | |
| Ex. 16 | A | 0.44 | 4.0 | 650 |
| Ex. 17 | A | 0.11 | 4.1 | 600 |
| Ex. 18 | A | 0.02 | 5.1 | 575 |
| Ex. 19 | A | 0.01 | 6.1 | 575 |
| Ex. 20 | A | 0.39 | 4.0 | 625 |
| Ex. 21 | A | 0.10 | 4.5 | 600 |
| Ex. 22 | A | 0.02 | 5.3 | 575 |
| Ex. 23 | A | 0.01 | 6.3 | 575 |
| Ex. 24 | B | 0.43 | 4.0 | 650 |
| Ex. 25 | B | 0.12 | 4.2 | 600 |
| Ex. 26 | B | 0.03 | 5.2 | 575 |
| Ex. 27 | B | 0.01 | 6.2 | 575 |
| Ex. 28 | A | 0.10 | 5.5 | 575 |
| Ex. 29 | A | 0.12 | 5.8 | 575 |
| Com. Ex. 3 | C | 0.11 | 12.0 | 475 |

Note:
[(1)]Having the chemical composition shown in Table 1 and an average particle size of 14.1 μm.
[(2)]Having the chemical composition shown in Table 1 and an average particle size of 30.1 μm.
[(3)]Having the chemical composition shown in Table 1 and an average particle size of 15.1 μm.
[(4)]Having the chemical composition shown in Table 1 and an average particle size of 15 μm.
[(5)]Having the chemical composition shown in Table 1 and an average particle size of 12 μm.
[(6)]Formulation based on a solid content.

EXAMPLE 30

A honeycomb structure green body integrally having a peripheral wall 3 and cell walls 4 was produced in the same manner as in Example 1. This green body was dried in an induction-drying furnace. Gripped by a jig on a lathe, the dried green body was rotated at 260 rpm to remove a deformed portion as deep as three cells from its peripheral portion by a cemented carbide cutting tool under the conditions of a cutting depth of 5 mm and a feed of 1.0 mm/second, to provide a honeycomb body 10 with grooves exposed on its periphery.

This honeycomb body 10 was charged into a firing furnace with its one open end abutting a honeycomb table, and temperature elevation was carried out at a speed of 5° C./hour from room temperature to 500° C., and then at a speed of 20° C./hour from 500° C. to 1425° C., followed by keeping it at the highest temperature for 10 hours. After firing, it was slowly cooled to obtain a fired honeycomb having an outer diameter of 264.7 to 265.7 mm and a length of 300 mm. The cell walls of this fired honeycomb had a porosity of 65%, an average pore size of 20 μm, a thickness of 0.3 mm, a pitch of 1.5 mm and a thermal expansion coefficient of $10.5 \times 10^{-7}$/° C. in a radial direction.

With this fired honeycomb 10 gripped by a pair of grip members 51, 51 shown in FIG. 12, a pasty coating material comprising 100 parts by mass of cordierite particles having an average particle size of 10 μm and 7 parts by mass (on a solid basis) of colloidal silica and kneaded with an organic binder and water was applied to a peripheral surface of the fired honeycomb 10 such that its outer diameter became 266.7 mm. Thereafter, it was dried at 120° C. for 2 hours and then fired at 850° C. for 2 hours. The thickness of the peripheral wall layer 12 in the resultant honeycomb structure was 0.5 to 1.5 mm (see FIG. 13(a)).

The isostatic strength of the honeycomb structure 1 was measured in the same manner as in Example 1. The honeycomb structure 1 was regarded as "good" when the isostatic strength was 1.0 MPa or more and less than 1.5 MPa, "excellent" when the isostatic strength was 1.5 MPa or more, and "poor" when the isostatic strength was less than 1.0 MPa. Incidentally, the honeycomb structure 1 was regarded as "pass" when the isostatic strength was 1.0 MPa or more, and "fail" when it was less than 1.0 MPa. Also, the thermal shock resistance temperature of the ceramic honeycomb structure 1 was measured in the same manner as in Example 1. The honeycomb structure 1 was regarded as "good" when the thermal shock resistance temperature was 500° C. or higher, "excellent" when it was 550° C. or higher, and "poor" when it was lower than 500° C. Incidentally, the honeycomb structure 1 was regarded as "pass" when the thermal shock resistance temperature was 500° C. or higher, and "fail" when it was lower than 500° C. The results are shown in Table 7.

EXAMPLE 31

A honeycomb body 10, from which a peripheral wall was removed, was produced in the same manner as in Example 30. 100 parts by mass of the same cordierite-forming material powder as the honeycomb body was mixed with 0.5 parts by mass of methylcellulose, a dispersant and water, to form a coatable pasty material. Sandwiched by a pair of grip members 51, 51 shown in FIG. 12, this honeycomb body 10 was coated with the coating material in a post-firing thickness of about 1.6 mm, to form a peripheral wall layer 12.

The honeycomb body 10 provided with the peripheral wall layer 12 was charged into a firing furnace such that its one open end abutted a honeycomb table, and fired under the same conditions as in Example 30 to obtain a fired honeycomb having an outer diameter of 266.7 to 267.7 mm and a length of 300 mm. Because the outer diameter of the honeycomb body 10 after firing was 266.7 to 267.7 mm due to dimensional change, a large outer-diameter portion was removed to make it uniform at 266.7 mm. The thickness of the peripheral wall layer 10 was 0.6 to 1.6 mm (see the steps in FIG. 13(b)). The isostatic strength and thermal shock resistance temperature of the resultant honeycomb structure 1 were measured in the same manner as in Example 30. The results are shown in Table 7.

EXAMPLE 32

A green body having a honeycomb structure was produced in the same manner as in Example 30. The peripheral wall 3 of the green body had deformed portions due to its own weight. After drying in an induction-drying furnace, the green body was charged into a firing furnace such that its one open end abutted a honeycomb table, and fired under the same conditions as in Example 30 to obtain a fired honeycomb having an outer diameter of 274.7 mm and a length of 300 mm. There were many fired honeycombs that were cracked under the influence of the deformation of the peripheral wall 3. The cell walls of this fired honeycomb had a porosity of 65%, an average pore size of 20 µm, a thickness of 0.3 mm, a pitch of 1.5 mm, and a thermal expansion coefficient of $10.5 \times 10^{-7}/°C$. in a radial direction.

Fired honeycombs subjected to no cracking in the firing step were mounted to a periphery grinding machine, to cut the peripheral walls 3 and the nearby cell walls 4 to a depth of about 4.5 mm (equivalent to three cells), thereby obtaining a honeycomb body 10 having an outer diameter of 265.7 mm, which had grooves on its periphery. A diamond grinder used for cutting had a peripheral speed of 2,000 m/minute, and a feed speed of 0.5 mm/minute. While the peripheral wall 3 was removed, part of the cell walls 4 were cracked. The peripheral surface of the honeycomb body 10 free from the peripheral wall 3 was coated with the same coating material as in Example 30 in a thickness of 0.8 to 1.2 mm, dried at 120° C. for 2 hours, and then fired at 850° C. for 2 hours. The isostatic strength and thermal shock resistance temperature of the resultant honeycomb structure 1 were measured in the same manner as in Example 30. The results are shown in Table 7.

EXAMPLE 33

A honeycomb green body, from which a peripheral wall was removed, was produced in the same manner as in Example 30 except that it was 50 mm longer at the time of firing. This honeycomb green body was charged into a firing furnace such that its one open end abutted a honeycomb table, and fired under the same conditions as in Example 30. The resultant fired honeycomb having an outer diameter of 264.7 to 265.7 mm and a length of 350 mm was cut at a position 50 mm from a surface abutting the table, to provide a honeycomb body 10 having an outer diameter of 265.5 to 265.9 mm and a length of 300 mm. The cell walls of this honeycomb body 10 had a porosity of 65%, an average pore size of 20 µm, a thickness of 0.3 mm, an pitch of 1.5 mm and a thermal expansion coefficient of $10.5 \times 10^{-7}/°C$. in a radial direction.

This honeycomb body 10 was coated on its peripheral surface with the same coating material as in Example 30 such that its outer diameter became 266.7 mm, dried at 120° C. for 2 hours, and then fired at 850° C. for 2 hours. The resultant peripheral wall layer 12 had a thickness of 0.8 to 1.2 mm. The isostatic strength and thermal shock resistance temperature of the resultant honeycomb structure 1 were measured in the same manner as in Example 30. The results are shown in Table 7.

EXAMPLE 34

Figure 11A:
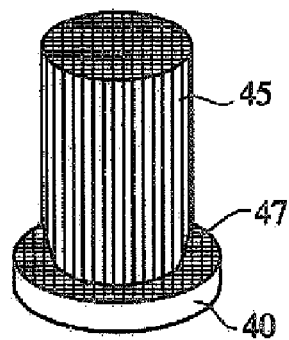
FIG. 11(a) is a perspective view showing a honeycomb green body placed on a table with its reduced-diameter portion adjacent to the table.
Figure 11B:
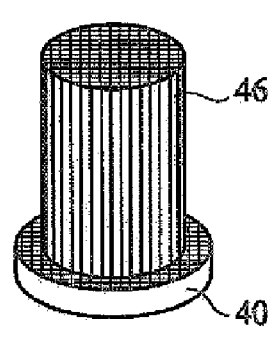
FIG. 11(b) is a perspective view showing a fired body obtained from the honeycomb green body shown in FIG. 11(a)

As shown in FIG. 11(a), a honeycomb body 45, from which a peripheral wall was removed, was produced in the same manner as in Example 30 except for determining the outer diameter of the dried green body based on dimensional change by firing. The honeycomb body 45 was charged into a firing furnace such that its one open end abutted a honeycomb table 40, to produce a honeycomb body 10 having an outer diameter of 265.4 to 265.9 mm and a length of 300 mm under the same conditions as in Example 30. The cell walls of this honeycomb body 10 had a porosity of 65%, an average pore size of 20 µm, a thickness of 0.3 mm, a pitch of 1.5 mm, and a thermal expansion coefficient of $10.5 \times 10^{-7}/°C$. in a radial direction.

The honeycomb body 10 was coated on its peripheral surface with the same coating material as in Example 30 except for containing 100 parts by mass of cordierite particles and 5 parts by mass of colloidal silica such that its outer diameter became 266.7 mm, dried at 120° C. for 2 hours, and then fired at 850° C. for 2 hours. The thickness of the resultant peripheral wall layer 12 was 0.8 to 1.2 mm. The isostatic strength and thermal shock resistance temperature of the resultant honeycomb structure 1 were measured in the same manner as in Example 30. The results are shown in Table 7.

EXAMPLE 35

The dry honeycomb structure obtained in the same manner as in Example 30, from which a peripheral wall was removed, was fired in the same manner as in Example 30, to provide a fired honeycomb having an outer diameter of 264.7 to 265.7 mm and a length of 300 mm. The cell walls of this fired honeycomb had a porosity of 62%, an average pore size of 20

μm, a thickness of 0.3 mm, a pitch of 1.5 mm and a thermal expansion coefficient of $10.5 \times 10^{-7}/°$ C. in a radial direction.

A honeycomb body 10 sandwiched by a pair of grip members 51, 51 was coated on its peripheral surface with the same coating material as in Example 30 except for containing 100 parts by mass of amorphous silica aggregates having an average particle size of 14 μm and 7 parts by mass of colloidal silica, such that its outer diameter became 266.7 mm, dried at 120° C. for 2 hours, and then fired at 850° C. for 2 hours. The thickness of the resultant peripheral wall layer 12 was 0.5 to 1.5 mm. The isostatic strength and thermal shock resistance temperature of the resultant honeycomb structure 1 were measured in the same manner as in Example 30. The results are shown in Table 7.

TABLE 7

| No. | Thickness of Peripheral Wall Layer (mm) | Isostatic Strength | Thermal Shock Resistance Temperature |
|---|---|---|---|
| Example 30 | 0.5 to 1.5 | Good | Good |
| Example 31 | 0.6 to 1.6 | Excellent | Good |
| Example 32 | 0.8 to 1.2 | Poor | Good |
| Example 33 | 0.8 to 1.2 | Good | Excellent |
| Example 34 | 0.8 to 1.2 | Good | Excellent |
| Example 35 | 0.5 to 1.5 | Good | Good |

It is clear from Table 7 that the method of the present invention can produce a honeycomb structure with excellent isostatic strength and thermal shock resistance. It is also clear that the honeycomb structures of Examples 33 and 34 having small nonuniformity in the thickness of peripheral wall layers are particularly excellent in a thermal shock resistance.

Though the embodiments of the present invention have been explained above in detail, the features of each embodiment are applicable to other embodiments unless particularly otherwise mentioned. Accordingly, for instance, regardless of whether or not there are stress release portions at least partially in the peripheral wall layer and/or between the peripheral wall layer and the grooves, or regardless of whether or not the thermal expansion coefficient of the peripheral wall layer is smaller than those of the cell walls of the ceramic honeycomb body in a radial direction, the removal of the peripheral wall may be carried out not only after firing a ceramic honeycomb green body, but also before firing.

In the ceramic honeycomb structure having a peripheral wall layer covering axial grooves of a ceramic honeycomb body, the stress release portions provided at least partially in a peripheral wall layer and/or between the peripheral wall layer and the grooves serve to release thermal shock stress, thereby preventing cracking from propagating into the cell walls. Accordingly, it is possible to prevent the decrease of the performance of cleaning an exhaust gas and capturing particulates, which would be caused by the detachment of the cell walls.

By forming the peripheral wall layer of the ceramic honeycomb structure by amorphous silica particles and an amorphous oxide matrix, the thermal expansion coefficient of the peripheral wall layer can be made smaller than those of the cell walls in a radial direction, thereby improving the thermal shock resistance. The ceramic honeycomb structure having such features is suitable for catalytic converters for cleaning an exhaust gas and filters for capturing particulates. Because cracking due to thermal shock does not easily occur, the ceramic honeycomb structure is particularly suitable for catalytic converters for cleaning an exhaust gas.

What is claimed is:

1. A method for producing a ceramic honeycomb structure comprising the steps of:
    shaping a soft ceramic material by extrusion and drying to form a ceramic honeycomb green body integrally having a peripheral wall and cell walls,
    firing said green body,
    removing said peripheral wall and nearby cell walls from the resultant fired body, so that axial grooves are exposed,
    covering said axial grooves with a coating material having a viscosity of 28,000 cP or more to form a peripheral wall layer, such that stress release portions in the form of space are formed at least partially between said peripheral wall layer and said grooves.

2. The method for producing a ceramic honeycomb structure according to claim 1:
    wherein stress release portions in a slit shape are formed in said peripheral wall layer in addition to said stress release portions in the form of space.

3. The method for producing a ceramic honeycomb structure according to claim 2, where said coating material is dried at a temperature of 70° C. or higher.

4. The method of producing a ceramic honeycomb structure according to claim 1, wherein the said number of grooves having said space between said peripheral wall layer and said grooves is 7% or more of the number of the total grooves.

5. The method for producing a ceramic honeycomb structure according to claim 1, wherein said coating material has a viscosity of 45,000 cP or more.

6. The method for producing a ceramic honeycomb structure according to claim 5, wherein the number of grooves having said space between said peripheral wall layer and said grooves is 42% or more of the number of the total grooves.

7. A method for producing a ceramic honeycomb structure comprising the steps of:
    shaping a soft ceramic material by extrusion and drying to form a ceramic honeycomb green body integrally having a peripheral wall and cell walls,
    firing said green body,
    removing said peripheral wall and nearby cell walls from said resultant fired body so that axial grooves are exposed,
    covering said axial grooves with a coating material to form a peripheral wall layer,
    wherein said coating material comprises 100 parts by mass of amorphous silica particles and 2 to 35 parts by mass of colloidal silica and/or colloidal alumina,
    said amorphous silica particles having a thermal expansion coefficient of $10.0 \times 10^{-7}/°$ C. or less, an average particle size of 1 to 100 μm and an aspect ratio of 10 or less.

8. A method for producing a ceramic honeycomb structure comprising the steps of:
    shaping a soft ceramic material by extrusion and drying to form a ceramic honeycomb green body integrally having a peripheral wall and cell walls,
    removing said peripheral wall and nearby cell walls from said green body, so that axial grooves are exposed, and
    covering said axial grooves with a coating material to form a peripheral wall layer before or after firing said green body, said coating material having a viscosity of 28,000 cP or more, such that stress release portions in the form of space are formed at least partially between said peripheral wall layer and said grooves.

9. The method for producing a ceramic honeycomb structure according to claim 8, wherein stress release portions in a slit shape are formed in said peripheral wall layer in addition to said stress release portions in the form of space.

10. The method for producing a ceramic honeycomb structure according to claim 9, wherein said coating material is dried at a temperature of 70° C. or higher.

11. The method for producing a ceramic honeycomb structure according to claim 8, wherein the number of grooves having said space between said peripheral wall layer and said grooves is 7% or more of the number of the total grooves.

12. The method for producing a ceramic honeycomb structure according to claim 8, wherein said coating material has a viscosity of 45,000 cP or more.

13. The method for producing a ceramic honeycomb structure according to claim 12, wherein the number of grooves having said space between said peripheral wall layer and said grooves is 42% or more of the number of the total grooves.

14. A method for producing a ceramic honeycomb structure comprising the steps of:
shaping a soft ceramic material by extrusion and drying to form a ceramic honeycomb green body integrally having a peripheral wall and cell walls,
removing said peripheral wall and nearby cell walls from said green body, so that axial grooves are exposed, and
covering said axial grooves with a coating material to form a peripheral wall layer before or after firing said green body, said coating material comprising 100 parts by mass of amorphous silica particles and 2 to 35 parts by mass of colloidal silica and/or colloidal alumina, said amorphous silica particles having a thermal expansion coefficient of $10.0 \times 10^{-7}/°$ C. or less, an average particle size of 1 to 100 μm and an aspect ratio of 10 or less.

* * * * *